United States Patent
Wang et al.

(10) Patent No.: US 11,164,220 B2
(45) Date of Patent: Nov. 2, 2021

(54) INFORMATION PROCESSING METHOD, SERVER, AND COMPUTER STORAGE MEDIUM

(71) Applicant: TENCENT TECHNOLOGY (SHENZHEN) COMPANY LIMITED, Shenzhen (CN)

(72) Inventors: Chunhui Wang, Shenzhen (CN); Xihong Chen, Shenzhen (CN); Jiahuan Zhai, Shenzhen (CN); Pengfei Liu, Shenzhen (CN); Wanhe Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 295 days.

(21) Appl. No.: 16/025,677

(22) Filed: Jul. 2, 2018

(65) Prior Publication Data

US 2018/0315098 A1    Nov. 1, 2018

Related U.S. Application Data

(63) Continuation of application No. PCT/CN2017/071016, filed on Jan. 12, 2017.

(30) Foreign Application Priority Data

Jan. 13, 2016    (CN) .......................... 201610022487.2

(51) Int. Cl.
*G06Q 30/00*    (2012.01)
*G06Q 30/02*    (2012.01)
(Continued)

(52) U.S. Cl.
CPC ......... *G06Q 30/0276* (2013.01); *G06F 16/00* (2019.01); *G06F 16/9577* (2019.01); *G06Q 30/0277* (2013.01); *G06Q 30/02* (2013.01)

(58) Field of Classification Search
CPC .......... G06Q 30/0276; G06Q 30/0277; G06Q 30/02; G06F 16/9577; G06F 16/00
See application file for complete search history.

(56) References Cited

U.S. PATENT DOCUMENTS

| | | | | |
|---|---|---|---|---|
| 6,400,996 B1 * | 6/2002 | Hoffberg | ............ | G05B 19/0426 370/218 |
| 6,850,252 B1 * | 2/2005 | Hoffberg | ............ | G06K 9/00369 348/E7.061 |

(Continued)

FOREIGN PATENT DOCUMENTS

| | | |
|---|---|---|
| CN | 101311922 A | 11/2008 |
| CN | 101997886 A | 3/2011 |

(Continued)

OTHER PUBLICATIONS

"MediaView, A General Multimedia Digital Publication System," Richard L. Phillips, Communications of the ACM, pp. 75-83 (Jul. 1991, vol. 34, No. 7).*

(Continued)

*Primary Examiner* — Radu Andrei

(74) *Attorney, Agent, or Firm* — Anova Law Group, PLLC

(57) ABSTRACT

Embodiments of the present disclosure provide an information processing method, a server, and a computer storage medium. The method includes: collecting first information; selecting from the first information at least one information material, and generating, according to the first information material, a media information form template supporting at least two types of scenario presentation requirements; receiving a first request for the information material initiated by a data traffic monitor; sending the information material and the media information form template to the data traffic monitor; and generating a presentation result according to (Continued)

the information material and the media information form template.

20 Claims, 14 Drawing Sheets

(51) Int. Cl.
*G06F 16/957* (2019.01)
*G06F 16/00* (2019.01)

(56) References Cited

U.S. PATENT DOCUMENTS

| | | | | |
|---|---|---|---|---|
| 7,266,782 | B2* | 9/2007 | Hull | G06F 40/169 |
| | | | | 715/838 |
| 7,716,703 | B2 | 5/2010 | Sheldon | |
| 8,082,293 | B1* | 12/2011 | Doyle | G06F 9/5027 |
| | | | | 709/202 |
| 8,392,532 | B2* | 3/2013 | Wood | H04L 29/06027 |
| | | | | 709/219 |
| 8,612,515 | B2* | 12/2013 | Wood | H04L 67/1091 |
| | | | | 709/203 |
| 2002/0124082 | A1* | 9/2002 | San Andres | G06F 11/201 |
| | | | | 709/225 |
| 2005/0231390 | A1* | 10/2005 | Crane | G01C 23/005 |
| | | | | 340/945 |
| 2006/0200259 | A1* | 9/2006 | Hoffberg | G05B 15/02 |
| | | | | 700/86 |
| 2008/0307454 | A1* | 12/2008 | Ahanger | G06Q 30/02 |
| | | | | 725/36 |
| 2013/0227607 | A1* | 8/2013 | Saltonstall | H04N 21/458 |
| | | | | 725/35 |
| 2013/0282916 | A1* | 10/2013 | Carter | H04L 43/50 |
| | | | | 709/231 |
| 2015/0363066 | A1* | 12/2015 | Lemay | G06F 3/04817 |
| | | | | 345/173 |

FOREIGN PATENT DOCUMENTS

| | | |
|---|---|---|
| CN | 103974135 A | 8/2014 |
| CN | 104123345 A | 10/2014 |
| CN | 104461634 A | 3/2015 |
| CN | 104486416 A | 4/2015 |
| CN | 105701217 A | 6/2016 |

OTHER PUBLICATIONS

Philips; Interactive learning thorugh visualization; Springer Verlag; 80 pages; 1992.*
Andrews; Calculating the benefits of sponsored data for an individual content provider; IEEE 2014; 6 pages; 2014.*
Chen; In-Depth Survey of Digital Advertising Technologies; IEEE 2016; pp. 2124-2148; 2016.*
The State Intellectual Property Office of the People's Republic of China (SIPO) Office Action 1 for 201610022487.2 dated Oct. 12, 2019 7 Pages (including translation).
The World Intellectual Property Organization (WIPO) International Search Report for PCT/CN2017/071016 dated Apr. 11, 2017 6 Pages (including translation).

* cited by examiner

No.12 Normal Data

No.13 Normal Data xxxxxxxxxx

Security

No.14 Normal Data

No.15 Normal Data

No.16 Normal Data

INFORMATION PROCESSING METHOD, SERVER, AND COMPUTER STORAGE MEDIUM

RELATED APPLICATION

This application is a continuation application of PCT Application No. PCT/CN2017/071016, filed on Jan. 12, 2017, which claims priority to Chinese Patent Application No. 2016100224872, entitled "INFORMATION PROCESSING METHOD, SERVER, AND COMPUTER STORAGE MEDIUM," filed on Jan. 13, 2016. Both applications are incorporated by reference in their entirety.

FIELD OF THE TECHNOLOGY

The present disclosure relates to communications technologies, and in particular, to an information processing method, server, and computer storage medium.

BACKGROUND OF THE DISCLOSURE

The amount of information has grown explosively in the big data era, and information sharing has become an important part of our daily life. Information is shared in various manners. For example, when searching on a web page by using a key word, in addition to the content required or sought by a user, information related to the content or a link or web address of the information may typically be presented to the user as well. There are various ways of sharing information which may involve engaging in activities of interest to users, such as watching a video, reading a book, or listen to music, for example on an application of a mobile terminal.

In addition to the various ways of information sharing, information or contents that are shared are also diverse, which may be in the form of a text, an image, a video, a short video such as a Flash video, and the like, or combinations thereof. Moreover, advertising information may be presented before or after the information or content is played, or may be introduced or provided with the information or content and displayed. However, often, a presentation format of an advertisement cannot be adaptively modified after it is generated. For example, when an advertisement is designed to be shown on both a screen of a mobile terminal and a screen of a PC terminal, because the display resolutions, color displays, or the like vary in the different devices, the same advertisement will need to be separately designed and/or prepared for the different devices.

SUMMARY

The embodiments of the present disclosure provide an information processing method, server, and computer storage medium, to resolve at least problems exist in the existing technology.

In some embodiments of the present disclosure, an information processing method is provided. The method comprises: collecting a first information; parsing, processing or selecting the first information to obtain at least one information material, and generating, based on or according to the first information material, a media information form template or format supporting at least two types of scenario presentation requirement; receiving a first request initiated by a data traffic monitor; and sending the information material and the media information form template corresponding to the information material to the data traffic monitor, to generate a presentation result according to the information material and the media information form template.

In some embodiments of the present disclosure, a server is provided which comprises: a collection unit, configured to collect a first information; a template generation unit, configured to parse, process or select the first information to obtain at least one information material, and generate, based on or according to the information material, a media information form template or format supporting at least two types of scenario presentation requirements; a request obtaining unit, configured to obtain a first request initiated by a data traffic monitor; and a request response unit, configured to respond to the first request, and send the information material and the media information form template corresponding to the information material to the data traffic monitor.

Another aspect of the present disclosure provides a computer storage medium storing a computer executable instruction, the computer executable instruction being configured to perform the information processing method. The method comprises: collecting a first information; parsing, processing or selecting the first information to obtain at least one information material, and generating, based on or according to the first information material, a media information form template or format supporting at least two types of scenario presentation requirements; receiving a first request initiated by a data traffic monitor; and sending the information material and the media information form template corresponding to the information material to the data traffic monitor, to generate a presentation result according to the information material and the media information form template corresponding to the information material.

In some embodiments, one or more of the collection unit, the template generation unit, the request obtaining unit, and the request response unit may be implemented by using a central processing unit (CPU), a digital signal processor (DSP), or a field-programmable gate array (FPGA).

According to the embodiments of the present disclosure, a media information form template or format supporting at least two types of use, scenario or presentation requirements can be generated based on or according to a same set of information material, and therefore, when a first request initiated by a data traffic monitor is responded to, the information material and the media information form template corresponding to the information material are sent to the data traffic monitor, to obtain a presentation result according or corresponding to the information material and the media information form template. In some embodiments of the present disclosure, an information material may correspond to or be adapted for a plurality of media information form templates or formats, each of which may correlate with a different content playback scenario or requirement. Thus, the plurality of media information form templates corresponding to the same information material which can be adaptively used for/under different use scenarios and/or terminal configurations/parameters is provided or created to achieve a seamless integration of the information material and/or its contents with the various user interfaces designed for display or playback of information desired by the user.

DESCRIPTION OF EMBODIMENTS

Figure 1:
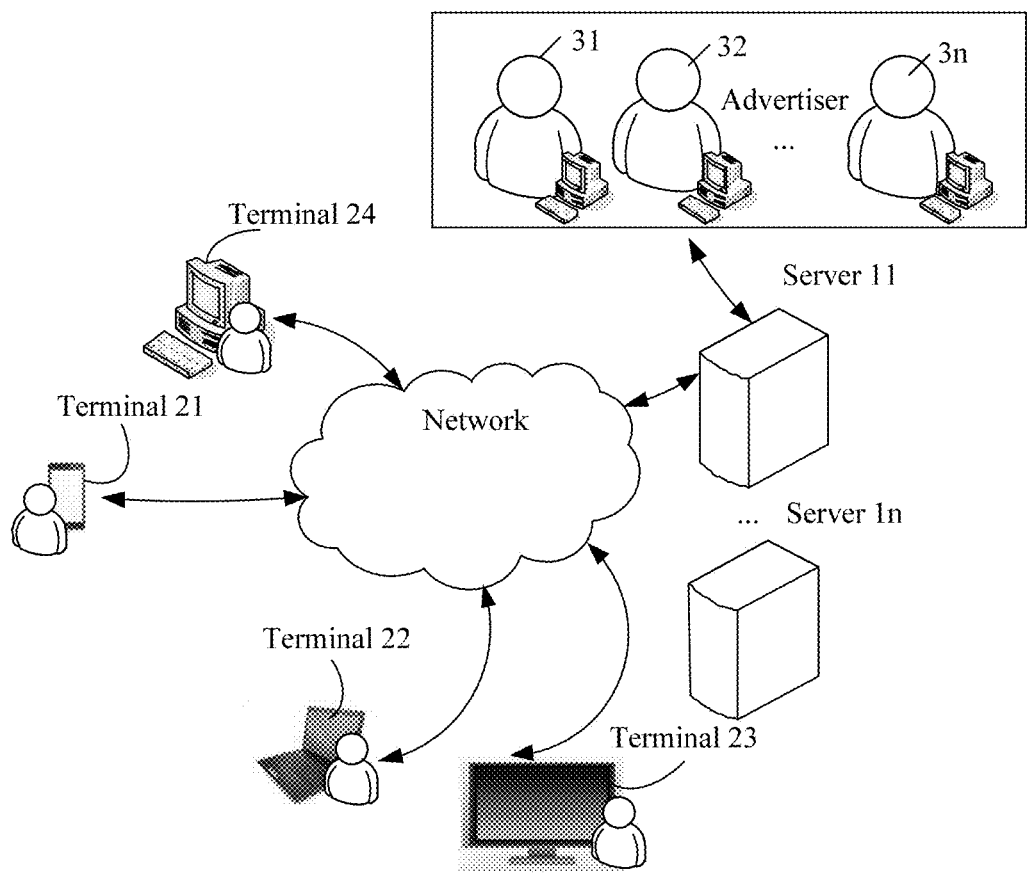
FIG. 1 is a schematic diagram of each hardware entity performing information interaction according to an embodiment of the present disclosure.

The following further describes the implementations of the technical solutions in detail with reference to the accompanying drawings.

In some embodiments of the present disclosure, a secondary information, such as information provided along with or alongside information or content selected, requested or of interest to the user (such as an advertisement information) is adapted for use or display under different use scenarios. Moreover, a variety of presentation forms corresponding to the secondary information are prepared to adaptively match with or support the different use scenarios and/or device configurations/parameters (each having different use scenarios), so that seemly integration of the information or contents on any user interface can be achieved.

Advertisement can be presented in various forms. In the field of mobile video advertisement, possible forms include a pre-video advertisement (a video advertisement presented before or after a video is played), an information stream advertisement, an incentive video advertisement (a gift is rewarded after the video is watched), a native advertisement, etc. An information stream advertisement, as used herein, refers to a video advertisement form introduced to an information stream, and automatically plays after being slid into display screen. A native advertisement, as used herein, refers to a type of advertisement that matches the form and function of the platform upon which it appears. It is produced by an advertiser with the specific intent to promote a product, while matching the form and style which would otherwise be seen in the work of the platform's editorial staff. The word "native" refers to this coherence of the content with the other media that appears on the platform. A native mobile video advertisement, as used herein, refers to a video material placed by an advertiser and presented in a web page or an application traffic with seamless integration with the content of the web page or the application. In some embodiments, the native mobile video advertisement can be placed before or after a main video content and function as pre-video advertisement, or can be inserted into an information stream and function as information stream advertisement. Different forms of advertisement can be standardized and/or presented in a media information form template.

A media information form template, as used herein, refers to a template that, when given any source media (e.g., one or more advertisement element) with any original size or format, configures a standard/uniform presentation form and/or presentation functionality of the source media. For example, the media information form template can include configurations about: available user control functions of a media viewer (e.g., pause, mute, full-screen, more information, download) hosting the source media, locations of icons corresponding to the user control functions on the media viewer, objects placed on the media viewer (e.g., logo of advertiser, number of views of the source media), trigger conditions for displaying the icons and/or the objects (e.g., display by default, display when tapped once), and available reporting functions for data traffic monitor (e.g., report when the source media is played, report current playback duration, report when certain icon is selected).

Further, the media information form template can include different sets of configurations corresponding to different types of the source media. In other words, the media information form template can implement a standard frame or structure having same configurations of some components (e.g., same media viewer, certain same user control functions, same placement of certain objects) that allows variations on configurations of other components corresponding to different types of the source media. In one embodiment, the media information form template is applicable for both video type source media and non-video type source media. For example, same media viewer can be used to host/present both types of source media, same reporting functions can be used to report exposure of the source media, while variated configurations on, for example, available user control functions, corresponding to each type (e.g., pause/play and mute/unmute control available for video type source media that are not used on non-video type source media) can be implemented. In another embodiment, the media information form template is applicable for both APP advertisement and non-APP advertisement. For example, same media viewer can be used to host both types of advertisement with additional configurations directed to APP advertisement, such as, additional objects placed on media viewer to indicate download count, review score, price, and/or download/install progress of the APP. In some embodiments, a media information form template corresponding to a specific type of source media can be generated by implementing the standard structure frame or structure and the set of configurations corresponding to the specific type of source media. An interface can be provided to a user to customize the media information form template by specifying the type of source media and/or other customizable configurations.

In some embodiments, one media information form template can be used to present multiple advertisement forms by defining different sets of configurations for the multiple advertisement forms. In some other embodiments, one media information form template can have one corresponding advertisement form. That is, if the current use scenario requires the advertisement to present in the pre-video form, a first media information form template can be applied; and if the current use scenario requires the advertisement to present in the information stream form, a second media information form template can be applied.

In some embodiments, use scenarios of an advertisement can be differentiated according to or based on places where the advertisement is presented, such as various types and/or configurations of terminals, various types of web pages, various types of applications or platforms, various theme contents of a web page or an application matching content of the advertisement, etc. In some embodiments, use scenarios of an advertisement can be differentiated according to or based on suitable advertisement forms in a web page or an application, such as pre-video advertisement, information stream advertisement, etc. In some embodiments, a single media information form template can be applied in multiple places where the advertisement is presented and/or multiple forms of advertisements. For example, the single media information form template can be applied in advertisements that need to be presented in both mobile terminals and desktop terminals, in both web pages and applications, etc. In some embodiments, multiple media information form templates can be provided, each having one or more matching use scenarios. For example, if the current use scenario requires the advertisement to present in the pre-video form, the first media information form template can be applied; and if the current use scenario requires the advertisement to present in the information stream form, the second media information form template can be applied.

In some embodiments of the present disclosure, a first server may be a system for analyzing and/or processing advertisements, or an advertisement analyzing and processing platform. The first terminal may be a terminal operated by an advertiser, or an object or system for providing one or more advertisement elements such as advertisement material or content promotion. An advertisement element may be referred to as a material. An advertisement element may include a video or other forms of advertisement. A second server may be a system for monitoring data traffic, or a data traffic monitor platform server or system. A first request may be a request to post advertisement. In some embodiments, a second server may be an information processing platform of the data traffic monitor with which the advertisement is incorporated. A second terminal may be a terminal used by or belonging to a user, or a terminal which can receive advertisement.

FIG. 1 is a schematic diagram of each hardware entity performing information interaction according to an embodiment of the present disclosure. FIG. 1 includes servers 11, . . . , 1n and terminals 21 to 24. The terminals 21 to 24 perform information interaction with the servers by using a wired or wireless network. The terminals include devices such as a mobile phone, a desktop PC, an all-in-one machine, and the like. In an example, the servers 11, . . . , 1n may further interact with a first terminal by using a network. The first terminal may be a terminal in which an advertiser is in, or an object or system for providing an advertisement material or content promotion. After submitting an advertisement expected to be placed, the submitted advertisement may be stored in a storage or suitable server or server cluster. An administrator may perform a series of processing, such as auditing, of the advertisement placed by the first terminal or an advertiser. The terminals 21 to 24 may be r second terminals. A second terminal may be used by a user for watching a video on a suitable video application, for playing games on a game application, for browsing a web page on a network or the Internet, or the like. In some embodiments, a second terminal is a terminal which can receive advertisements.

An advertisement may be added to all applications or a specified application (such as a game, video, or browser application, or the like) installed in a terminal to present additional recommended, targeted or selected information to a user. According to embodiments of the present disclosure, based on the system shown in FIG. 1, the functions that may be implemented by or on the server may be implemented by or on a single or multiple server(s), or a server cluster. An implementation or embodiment of the present disclosure includes implementing all or some of the functions on a single server, or on a first server and a second server.

The first server, such as an advertisement analyzing and processing platform, may collect a first information from a first terminal; and parses, select, or process the first information. The first information may be video advertisement information and/or image advertisement information and/or text advertisement information. Using the video advertisement information as an example, at least one advertisement material is obtained or selected, and a video form template or video format supporting at least two types of use scenario or presentation requirements may be generated according to the same advertisement material(s). The first server may obtain a first request, such as an advertisement request, initiated by the second server. The second server may be a data traffic monitor platform. The first server may respond to the first request, and send the advertisement material and the video form template corresponding to the advertisement material to the second server. The second server obtains, according to the advertisement material and the corresponding video form template, a presentation result or format matching or associated with a presentation requirement of a current or required scenario. In one example, the current or required scenario (e.g., a use scenario) may be a movie or video preview, pre-movie video or an information stream video for or provided on a data traffic monitor platform. In some embodiments of the present disclosure, the presentation result may be a web page or application screen/page of or corresponding to a data traffic monitor, which can be displayed, used, or presented in a second terminal. In some embodiments, in the web page or application page (or view) of or corresponding to the data traffic monitor delivered to and presented at the second terminal, the presentation result is a seamless integration of: a rendering result obtained or created based on or according to the advertisement material (or content determined or inferred to be of interest to an user, or content which is not directly selected or requested by the user for presentation to the user) and the video form template, and original or existing page information in the web page or application page (or view) of or corresponding to the data traffic monitor. In an embodiment, the second terminal may be a terminal in which a user is using, or may be a terminal in which as an advertisement is being presented. According to the embodiments of the present disclosure, a media information form template or format supporting a plurality of scenario presentation requirements (e.g., use scenarios) such as a pre-movie video, movie preview, advertisement or an information stream video can be obtained based on or according to a same set of information materials, and after the information materials and the media information form template whose scenario or scenarios corresponding to the set of information materials are sent to a data traffic monitor, a presentation result of the data traffic monitor can be obtained according or corresponding to the set of information materials and the media information form template. In some embodiments of the present disclosure, a material or content may correspond to media information form templates of a plurality of scenarios, and the media information form templates can meet the presentation requirements of diversified scenarios, and support an adaptive presentation form that matches or corresponds with different scenarios or terminal configuration parameters in different scenarios, to achieve a seamless integration of the information material and/or its contents with the various user interfaces designed for display or playback of information desired by the user.

The example in FIG. 1 is a system architecture example for implementing the embodiments of the present disclosure. The embodiments of the present disclosure are not limited to the system structure shown in FIG. 1. Based on the system architecture, each embodiment of the present disclosure is provided.

Figure 2:
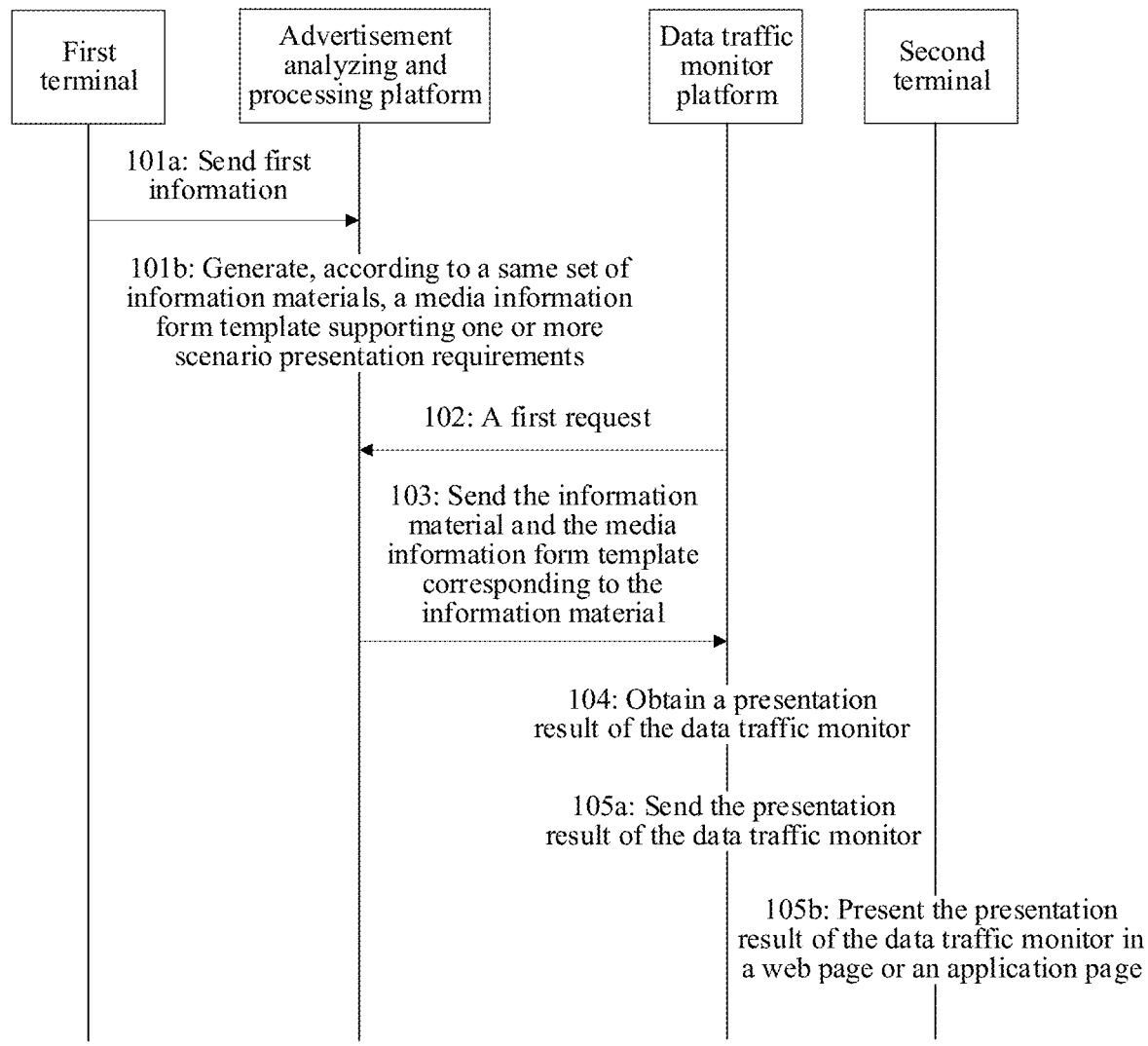
FIG. 2 is a schematic diagram of an implementation procedure according to Embodiment 1 of the present disclosure.

An information processing method according to an embodiment of the present disclosure. As shown in FIG. 2, the method includes the following steps.

Step 101: Obtain/Collect a first information from a first terminal, parse, process or select the first information, to obtain at least one information material, and generate, based on or according to the information material, a media information form template or format supporting at least two types of use, scenario or presentation requirements.

The first information may be provided by, or obtained from, or by means of collection from the first terminal. The first terminal may be a terminal in which an advertiser is in, or an object or system for providing an advertisement material or content promotion. The first information may be video advertisement information and/or image advertisement information and/or text advertisement information. The first information may include at least one information material. Using the example where the first information is an advertisement information, the information material may be an advertisement material, or an advertisement element. In this case, the media information form template may be a video form template, such as an information stream video advertisement form and/or a pre-movie video advertisement form.

Step 102: Obtain or receive a first request initiated by or from a data traffic monitor.

Step 103: Respond to the first request, and send the information material and the media information form template based on or corresponding to the information material to the data traffic monitor.

Step 104: The data traffic monitor obtains a presentation result of the data traffic monitor according or corresponding to the information material and the media information form template.

Step 105: The data traffic monitor delivers the presentation result to a corresponding second terminal to present information, for example, to display the presentation result on a web page (such as an HTML5 page, hereinafter H5 page) corresponding to the data traffic monitor or an application page corresponding to the data traffic monitor e.g. of the second terminal.

According to this embodiment of the present disclosure, a first server may be an advertisement analyzing and processing platform. The first server may obtain an advertisement element or material from a first terminal or the advertisement element may be transmitted by the first terminal to the first server. The first terminal may be a terminal in which an advertiser is in, or an object or system for providing an advertisement material or content promotion. In some embodiments of the present disclosure, the first server, such as an advertisement analyzing and processing platform or system, generates, for a same advertisement element, a corresponding video form template supporting diversified video advertisement information in at least two types of scenarios. The first server may provide the video form template, or a first rendering result generated by the first server according to the advertisement element and the video form template, to a second server to perform designated modification (e.g., based on or according to where the advertisement is designated to be placed or presented, such as before or after a video or within an information stream) and presentation. The second server may be a data traffic monitor platform. Alternatively, the video form template, or the first rendering result generated by the first server according to the advertisement element and the video form template are directly provided to the second server for its own use, and the first rendering result is directly presented without modification.

In some embodiments of the present disclosure, the policy of whether to perform modification is automatically determined by the second server. The second server obtains, by re-rendering according to a specific modification policy (e.g., size, format, resolution, targeted user group, etc.) of the second server and based on the video form template, a video advertisement information adapted for or for presentation to the second terminal. In one example, when the second server is corresponding to a social networking page, the modification policy may include re-rendering the received information as a post on a timeline. In another example, when the second server is corresponding to a gaming App, the modification policy may include re-rendering the received information as a full-screen media to be triggered at certain time interval or in response to a user selection in the App. In another example, when the received information includes one or more tags related to the content of the advertisement, the second server can identify targeted user group matching the one or more tags, and only second terminals of users in the targeted user group will receive the advertisement from the second server. That is, a same advertisement element may be obtained from the first terminal (or transmitted by the first terminal), the video form template is generated by the first server, the processing or rendering is performed by the first server or by a second server, and the rendering result is presented or displayed on a second terminal. The same advertisement element can be played or displayed on different terminals, and a diversified video advertisement rendering result is obtained. Another example, a same advertisement element may be obtained from the first terminal, both the template and the rendering are generated by the first server, to obtain a rendering result, and the second server provides the rendering result to the second terminal. Accordingly, diversified video advertisement rendering results of a same advertisement element may be presented on different second terminals.

Additional embodiments are described below.

Figure 3:
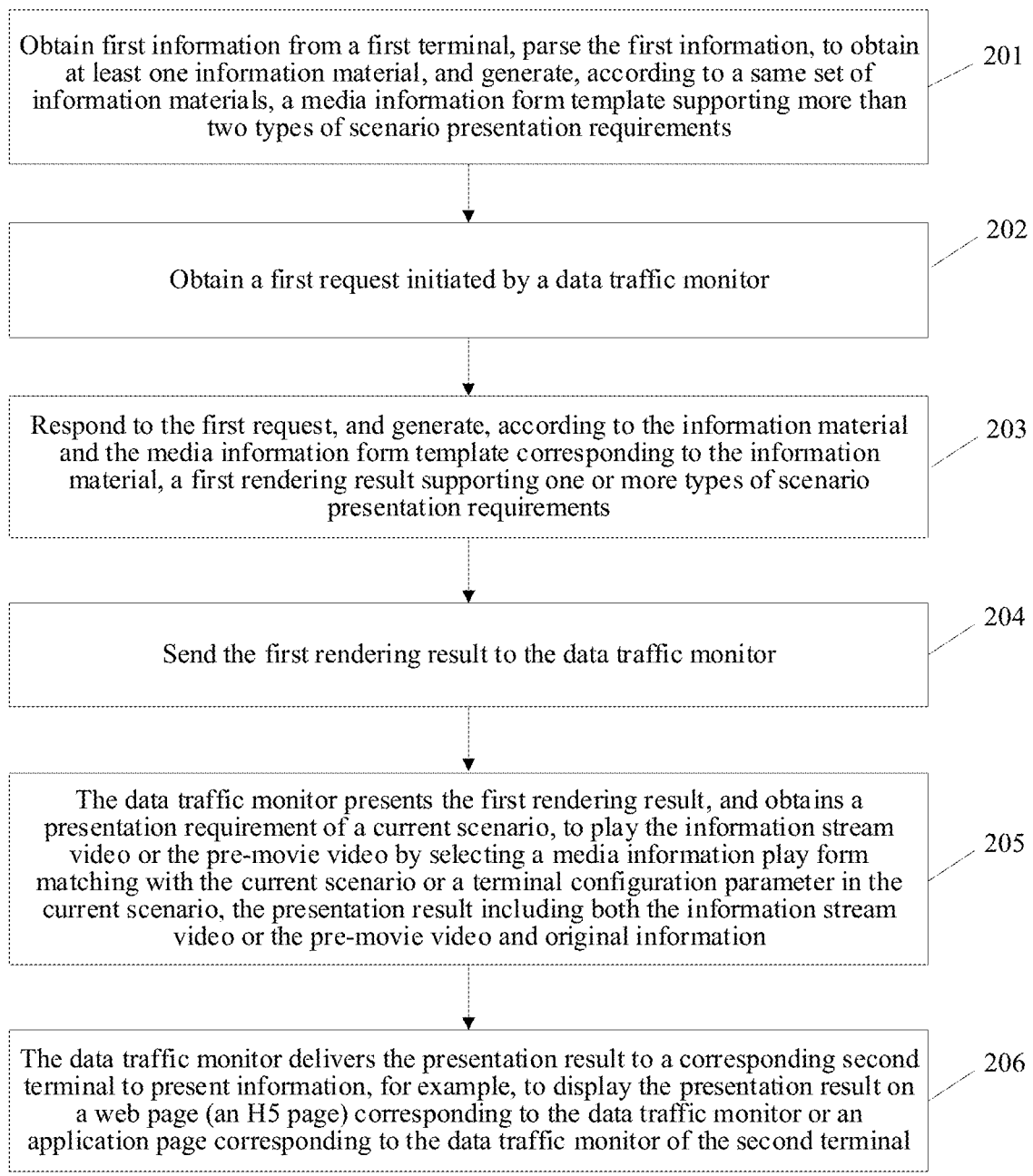
FIG. 3 is a schematic diagram of an implementation procedure according to Embodiment 2 of the present disclosure.

The embodiment as shown in FIG. 3 includes the following steps.

Step 201: Obtain first information from a first terminal, parse, process or select the first information, to obtain at least one information material, and generate, based on or according to a same set of information materials, a media information form template or format supporting at least two types of scenario presentation requirements.

The first information is obtained from or transmitted by the first terminal, and the first information may be video, image advertisement information, or text advertisement information, or combinations thereof. The first information includes at least one information material. Using the example where the first information is an advertisement information, the information material may be an advertisement material, or an advertisement element. In this case, the media information form template may be a video form template, such as an information stream video advertisement form and/or a pre-movie video advertisement form.

Step 202: Obtain a first request initiated, or initiating a first request, by a data traffic monitor.

Step 203: Respond to the first request, and generate, according to the information material and the media information form template or format corresponding to the information material, a first rendering result supporting at least two types of scenario presentation requirements.

The first rendering result includes at least one of an information stream video or a pre-movie video. In some embodiments, the first rendering result can be generated based on configuration customization requests from an advertiser on the media information form template.

Step 204: Send the first rendering result to the data traffic monitor.

The first rendering result is obtained by a first server by rendering. In an embodiment, the first server may obtain an advertisement element from the first terminal (such as the terminal in which an advertiser is in, or referred to as an object or system for providing an advertisement material or content promotion). After the first server generates, for a same advertisement element, a corresponding video form template supporting diversified video advertisement information in at least two types of scenarios, and generates the first rendering result according to the advertisement element and the video form template. In an embodiment, the first server provides the first rendering result to a second server for delivery of the first rendering result to a second terminal which performs direct presentation.

Step 205: The data traffic monitor receives the first rendering result, obtains a presentation requirement of a current scenario (e.g. for purposes of playing back the information stream video or the pre-movie video) and selects a media information form that matches or corresponds with the current scenario or a terminal configuration parameter of the current scenario. In some embodiments, the presentation requirement is provided by the second server and/or the advertiser. In an embodiment, the presentation result includes the information stream video or pre-movie video along with the original information.

Step 206: The data traffic monitor delivers the presentation result to a corresponding second terminal to present the information, for example, to display the presentation result on a web page (an H5 page) corresponding to the data traffic monitor or an application page corresponding to the data traffic monitor e.g. of the second terminal.

According to an embodiment of the present disclosure, a first information is obtained from or provided by a first terminal, and the first information may contain video advertisement, image advertisement, or text advertisement information, or combinations of two or more of those types of information. The first information includes at least one information material, and a media information form template supporting a plurality of scenario presentation requirements such as a pre-movie video, movie preview, advertisement and an information stream video is generated according to the selected or received information material. The first server generates, according to the information material and the media information form template corresponding to the information material, a first rendering result supporting a plurality of scenario presentation requirements. In an embodiment, the first rendering result includes at least one of the information stream video or the pre-movie video. The first rendering result is sent to the data traffic monitor, and the first rendering result is displayed on the data traffic monitor, thereby saving the data traffic monitor from performing the processing work. The resulting presentation form is integrated with content of various user interfaces.

Figure 4:
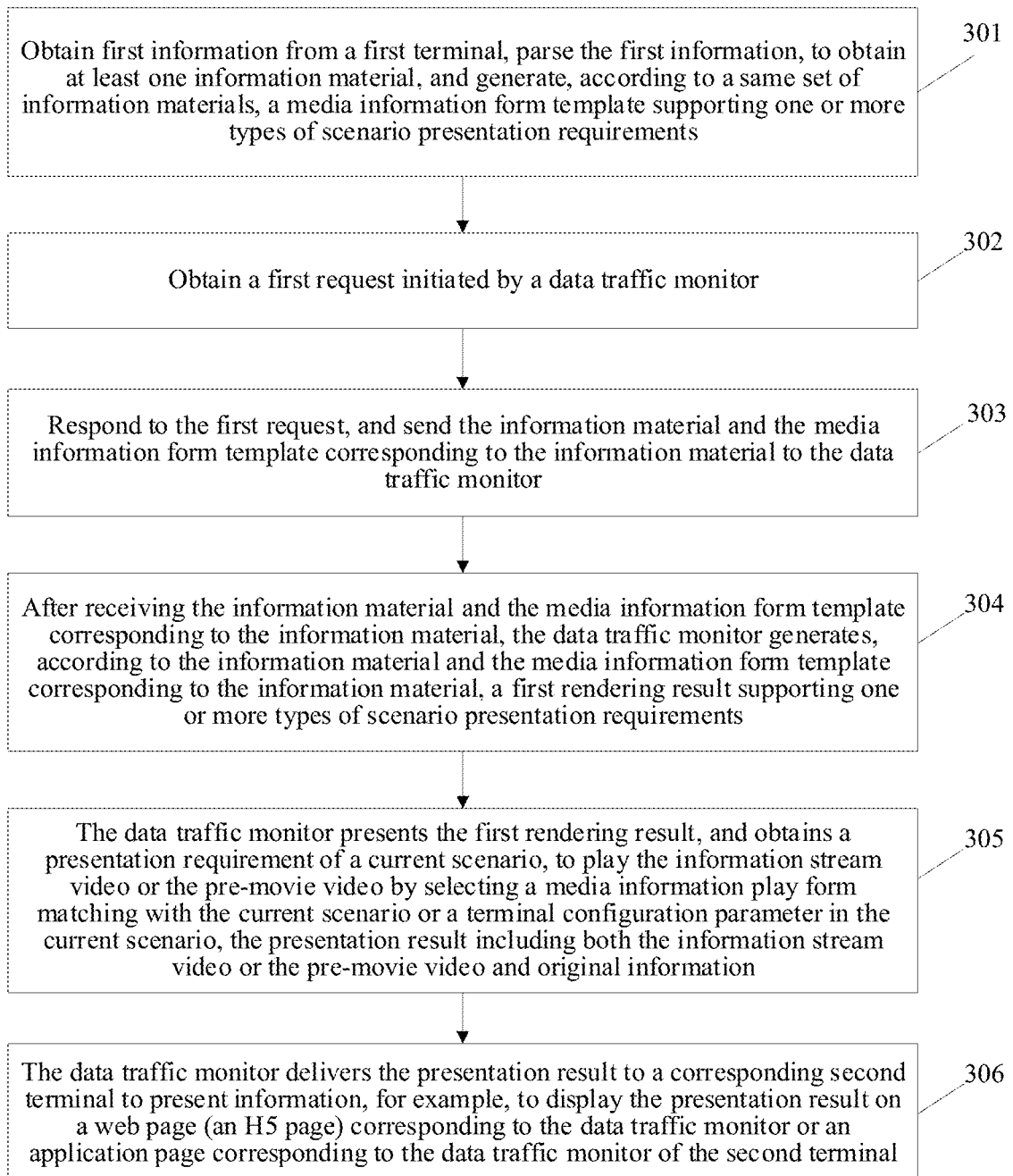
FIG. 4 is a schematic diagram of an implementation procedure according to Embodiment 3 of the present disclosure.

An information processing method according to an embodiment of the present disclosure is discussed below. As shown in FIG. 4, the method includes the following steps.

Step 301: Obtain a first information from a first terminal, parse, process or select the first information, to obtain at least one information material, and generate, based on or according to a same set of information material(s), a media information form template or format supporting at least two types of scenario presentation requirements.

The first information is obtained or received from the first terminal, and the first information may be video advertisement, image advertisement, or text advertisement information, or combinations of two or three of the foregoing types of information. The first information includes at least one information material. Using the example where the first information is an advertisement information as an example, the information material may be an advertisement material, or an advertisement element. In an embodiment, the media information form template may be a video form template, such as an information stream video advertisement form and/or a pre-movie video advertisement form.

Step 302: Obtain or receive a first request initiated by or from a data traffic monitor.

Step 303: Respond to the first request, and send the information material and the media information form template based on or corresponding to the information material to the data traffic monitor.

Step 304: After receiving the information material and the media information form template corresponding to the information material, the data traffic monitor generates, according to the information material and the media information form template corresponding to the information material, a first rendering result supporting at least two types of scenario presentation requirements.

The first rendering result may include at least one of an information stream video or a pre-movie video.

The first rendering result is obtained by a second server by rendering or processing. In an embodiment, a first server obtains an advertisement element from a first terminal. After the first server generates, for a same advertisement element, a corresponding video form template supporting diversified video advertisement information in at least two types of scenarios, and sends the advertisement element and the video form template to the second server, and after the second server generates the first rendering result according to the advertisement element and the video form template, the second server delivers the first rendering result to a second terminal to perform direct presentation.

Step 305: The data traffic monitor receives the first rendering result, obtains a presentation requirement of a current scenario (e.g. for purposes of playing back the information stream video or the pre-movie video) and selects a media information form that matches or corresponds with the current scenario or a terminal configuration parameter of the current scenario. In an embodiment, the presentation result includes information stream video or pre-movie video along with original information.

Step 306: The data traffic monitor delivers the presentation result to a corresponding second terminal to present the information, for example, to display the presentation result on a web page (an H5 page) corresponding to the data traffic monitor or an application page corresponding to the data traffic monitor e.g., of the second terminal.

According to this embodiment of the present disclosure, first information is provided by, or obtained from a first terminal, and the first information may contain video advertisement, image advertisement, or text advertisement information, or combinations of two or more of those types of information. The first information includes at least one information material, and a media information form template supporting a plurality of use, scenario, or presentation requirements such as a pre-movie video, movie preview, advertisement and an information stream video is generated according to the selected or received information material. The information material and the media information form template corresponding to the information material are sent to a data traffic monitor. The data traffic monitor obtains, by rendering according to the information material and the media information form template corresponding to the information material, a first rendering result supporting a plurality of scenario presentation requirements. The first rendering result includes at least one of an information stream video or a pre-movie video. The data traffic monitor can customize a presented first rendering result according to a requirement of the data traffic monitor, so that the requirement of the data traffic monitor is more satisfied, and a presentation form is integrated with content of various user interfaces.

Figure 5:
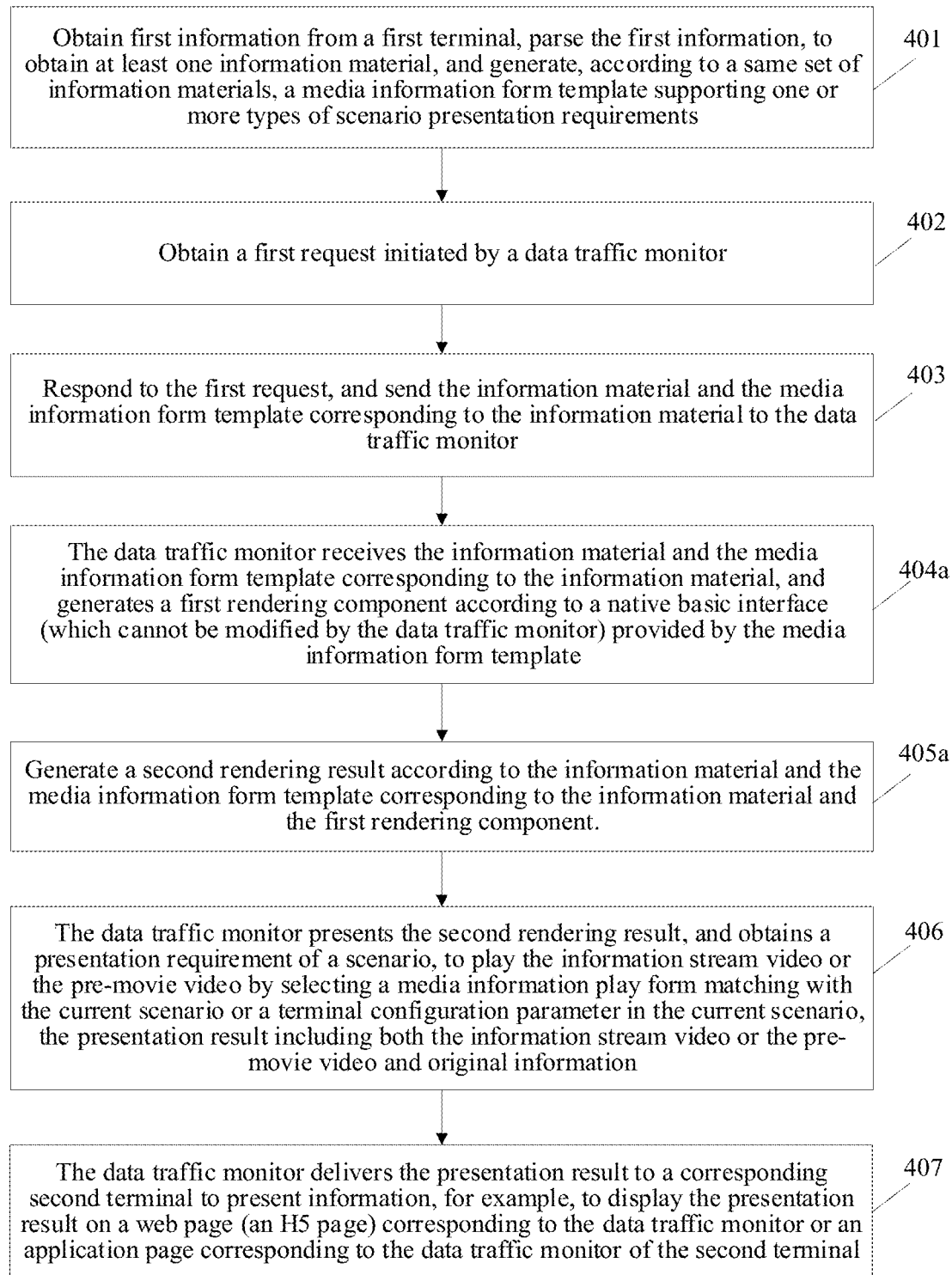
FIG. 5 is a schematic diagram of an implementation procedure according to Embodiment 4 of the present disclosure.

An information processing method according to one embodiment of the present disclosure is discussed below. As shown in FIG. 5, the method includes the following steps.

Step 401: Obtain first information from a first terminal, parse, process or select the first information, to obtain at least one information material, and generate, based on or according to a same set of information materials, a media information form template or format supporting at least two types of scenario presentation requirements.

In some embodiments, the first information is provided by, or obtained from, or by means of collection from the first terminal, and the first information may be video advertisement information and/or image advertisement information and/or text advertisement information. The first information includes at least one information material. Using the example where the first information is an advertisement information, the information material may be an advertisement material, which can also be referred to as an advertisement element. In this case, the media information form template may be a video form template, such as an information stream video advertisement form and/or a pre-movie video advertisement form.

Step 402: Obtain or receive a first request initiated by or from a data traffic monitor.

Step 403: Respond to the first request, and send the information material and the media information form template based on or corresponding to the information material to the data traffic monitor.

Step 404a: The data traffic monitor receives the information material and the media information form template corresponding to the information material, and generates a first rendering component according to a native basic interface (which cannot be modified by the data traffic monitor) provided by the media information form template.

In some embodiments, optionally, in a specific implementation process in this embodiment, step 404a may further be replaced with steps 404b to 404c below or may be jointly implemented by combining with any one of steps 404b to 404c below.

Step 404b: Generate a second rendering component according to a designated changeable interactive interface (which can be modified by the data traffic monitor according to a requirement, to perform customization) provided by the media information form template.

Step 404c: Generate a third rendering component according to the native basic interface and the designated changeable interactive interface.

Step 405a: Generate a second rendering result according to the information material and the media information form template corresponding to the information material and the first rendering component.

In some embodiments, optionally, in a specific implementation process in this embodiment, step 405a may further be replaced with steps 405b to 405c below or may be jointly implemented by combining with any one of steps 405b to 405c below, that is, the second rendering result can be generated according to the information material and the media information form template corresponding to the information material, the first rendering component, and/or the second rendering component, and/or the third rendering component.

Step 405b: Generate a second rendering result according to the information material and the media information form template corresponding to the information material and the second rendering component.

Step 405c: Generate a second rendering result according to the information material and the media information form template corresponding to the information material and the third rendering component.

The second rendering result herein includes at least one of an information stream video or a pre-movie video.

In some embodiments, the second rendering result is obtained by a second server by rendering. Specifically, a first server obtains the advertisement element from the first terminal. The first server generates, for a same advertisement element, a corresponding video form template supporting diversified video advertisement information presented in at least two types of scenarios. The advertisement element and the video form template are sent to the second server. The second server generates different rendering components according to a native basic interface and/or a designated changeable interactive interface provided by the video form template, that is, the second server performs customized modification on an original video form template. For example, in the original video form template, a player control in an information stream video is set to be a black button, after allowed customized modification is performed on the original video form template by the second server, the player control in the information stream video can be modified to be a white button, a yellow button, a green button, or a button of another color. Alternatively, a form of the player control may be modified. For example, a player control in an information stream video in the video form template is set to be a square button, after the customization modification is performed, the player control may be a circular button. Later, after the second server generates the second rendering result according to the advertisement element and the video form template, and the different rendering components, the second server delivers the second rendering result to the second terminal to perform direct presentation.

Step 406: The data traffic monitor presents the second rendering result, and obtains a presentation requirement of a scenario, to play the information stream video or the pre-movie video by selecting a media information play form matching with the current scenario or a terminal configuration parameter in the current scenario, the presentation result including both the information stream video or the pre-movie video and original information.

Step 407: The data traffic monitor delivers the presentation result to a corresponding second terminal to present information, for example, to display the presentation result on a web page (such as an H5 page) corresponding to the data traffic monitor or an application page corresponding to the data traffic monitor e.g. of the second terminal.

Based on the foregoing embodiment, the information processing method according to an embodiment of the present disclosure further includes the following steps.

Step 501: After the first information is collected, configure a target user group to which the information is placed, the first information including video information and image information.

Step 502: Generate an information placement targeting policy according to the first information and the target user group, the information placement targeting policy including performing a mixed arrangement on the video information and the image information.

Step 503: Place the first information to the target user group according to the information placement targeting policy, the target user group including the data traffic monitor.

Step 504: After the first request initiated by the data traffic monitor is obtained, if it is detected that there is no to-be-placed video information, insert, in an idle information position used for presenting the presentation result, the image information being in the mixed arrangement with the video information, and present the image information.

Step 505: The data traffic monitor presents the first rendering result or the second rendering result, and obtains a presentation requirement of a current scenario, to play the information stream video or the pre-movie video by selecting a media information play form matching with the current scenario or a terminal configuration parameter in the current scenario, the presentation result including both the information stream video or the pre-movie video and original information.

Step 506: The data traffic monitor delivers the presentation result to a corresponding second terminal to present information, for example, to display the presentation result on a web page (such as an H5 page) corresponding to the data traffic monitor or an application page corresponding to the data traffic monitor e.g. of the second terminal.

Based on the foregoing embodiment, the information processing method according to an embodiment of the present disclosure further includes the following steps.

Step 601: After the first information is collected, configure a target user group to which the information is placed, the first information including video information and image information.

Step 602: Generate an information placement targeting policy according to the first information and the target user group, the information placement targeting policy including: for a targeting condition of the video information, selecting at least one of a networking manner, educational background information, terminal device information, or area information to select the target user group to which the information is placed by targeting.

Step 603: Place the first information to the target user group according to the information placement targeting policy, the target user group including the data traffic monitor.

Step 604: The data traffic monitor presents the first rendering result or the second rendering result, and obtains a presentation requirement of a current scenario, to play the information stream video or the pre-movie video by selecting a media information play form matching with the current scenario or a terminal configuration parameter in the current scenario, the presentation result including both the information stream video or the pre-movie video and original information.

Step 605: The data traffic monitor delivers the presentation result to a corresponding second terminal to present information, for example, to display the presentation result on a web page (such as an H5 page) corresponding to the data traffic monitor or an application page corresponding to the data traffic monitor e.g. of the second terminal.

In an implementation of this embodiment of the present disclosure, the method further includes: when the information material and the media information form template corresponding to the information material are rendered, selecting at least one targeting condition; and obtaining, by rendering according to the at least one targeting condition, a first rendering result or a second rendering result corresponding to the at least one targeting condition, and using the first rendering result or the second rendering result as a presentation result of the data traffic monitor, the first rendering result being obtained by rendering at least according to the information material and the media information form template corresponding to the information material, and the second rendering result being obtained by rendering at least according to the information material and the media information form template corresponding to the information material and the rendering component.

The foregoing obtaining, by rendering according to the at least one targeting condition, a first rendering result or a second rendering result corresponding to the at least one targeting condition means that a finally obtained rendering result (the presentation result used in and presented by the data traffic monitor) not only can be generated by using the advertisement element, the video form template, and the different rendering components, but may also be directly related to the targeting condition. In this way, when the targeting condition determines a plurality of requirement factors such as that a target user group to which the information is placed is young people, the area is Beijing, and a favorite type, a more accurate rendering result can be obtained.

The server in this application may be a set of cross-platform server clusters, or may be a server implementing some functions of the cross-platform server clusters. Specific implementation includes all or some functions in the first server and the second server. For example, at least one combination of a collection unit, a template generation unit, a request obtaining unit, a request response unit, a rendering result generation unit, a configuration unit, a targeting policy generation unit, a mixed-arrangement performing unit, a rendering unit, or an information placement unit below may be specifically implemented in the first server. At least one combination of a play selection unit, a request response unit, a rendering result generation unit, or a mixed-arrangement performing unit may be specifically implemented in the second server.

Figure 6:
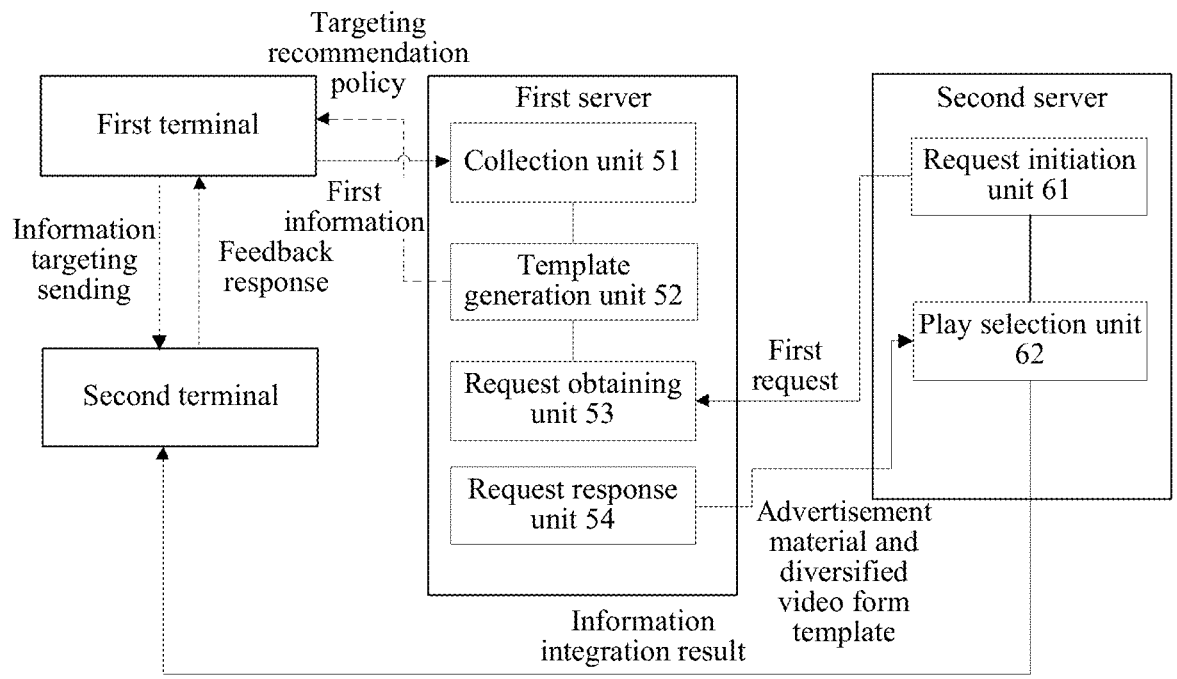
FIG. 6 is a schematic diagram of structural composition according to Embodiment 5 of the present disclosure.

A server according to an embodiment of the present disclosure. As shown in FIG. 6, a first server includes: a collection unit 51, configured to collect first information; a template generation unit 52, configured to parse, process or select the first information, to obtain at least one information material, and generate, based on or according to a same set of information materials, a media information form template or format supporting at least two types of scenario presentation requirements; a request obtaining unit 53, configured to receive or obtain a first request initiated by or from a data traffic monitor; and a request response unit 54, configured to respond to the first request, and send the information material and the media information form template based on or corresponding to the information material to the data traffic monitor, to obtain a presentation result according or corresponding to the information material and the media information form template.

In an implementation of this embodiment of the present disclosure, the template generation unit 52 is further configured to: before the sending the information material and the media information form template corresponding to the information material to the data traffic monitor, generate, according to the information material and the media information form template corresponding to the information material, a first rendering result supporting at least two types of scenario presentation requirements, the first rendering result including at least one of an information stream video or a pre-movie video; and the request response unit 54 is further configured to send the first rendering result to the data traffic monitor.

In an implementation of this embodiment of the present disclosure, the first server according to an embodiment of the present disclosure further includes a rendering unit, configured to: when the information material and the media information form template corresponding to the information material are rendered, select at least one targeting condition; and obtain, by rendering according to the at least one targeting condition, a first rendering result or a second rendering result corresponding to the at least one targeting condition, and use the first rendering result or the second rendering result as a presentation result of the data traffic monitor, the first rendering result being obtained by rendering at least according to the information material and the media information form template corresponding to the information material, and the second rendering result being obtained by rendering at least according to the information material and the media information form template corresponding to the information material and the rendering component.

A second server includes: a request initiation unit 61, configured to initiate a first request (such as an advertisement request); and a play selection unit 62, configured to: present the first rendering result in the data traffic monitor, and obtain a presentation requirement of a current scenario, to play the information stream video or the pre-movie video by selecting a media information play form matching with the current scenario or a terminal configuration parameter in the current scenario.

A first terminal is configured to provide the first information used by the first server for collection and analysis.

A second terminal is configured to present a final rendering result (including the first rendering result obtained by the first server by rendering and/or the second rendering result obtained by the second server by rendering) in a web page (H5) or an application page corresponding to the data traffic monitor.

Figure 7:
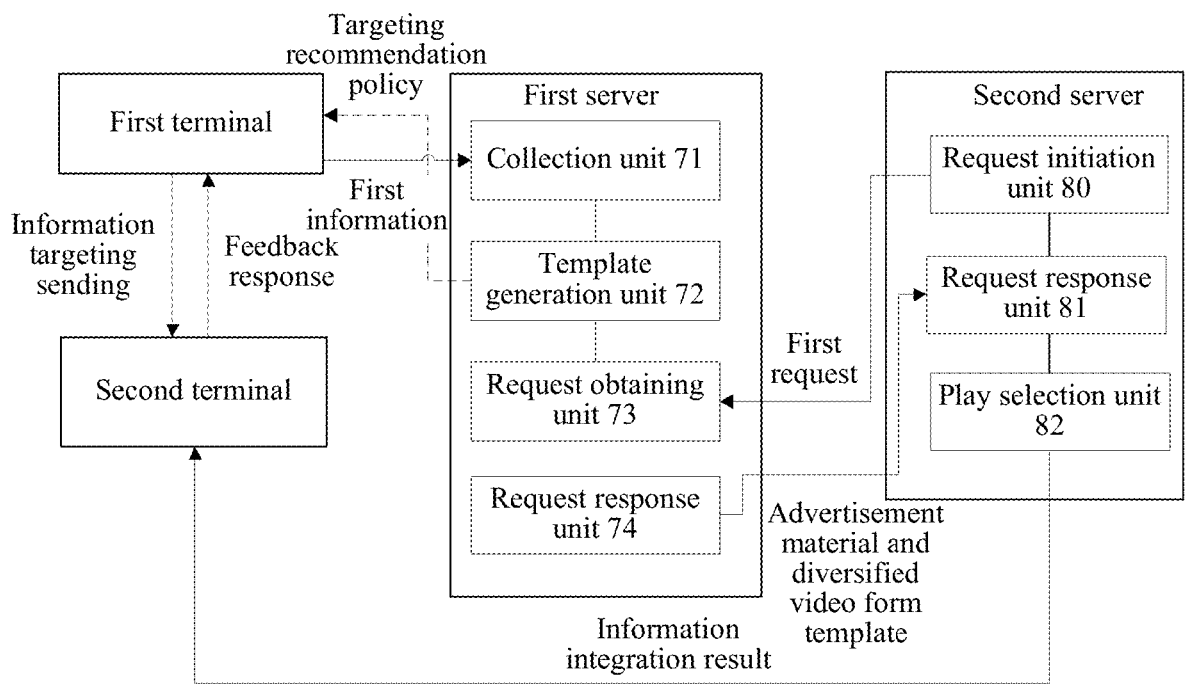
FIG. 7 is a schematic diagram of structural composition according to Embodiment 6 of the present disclosure.

A server according to an embodiment of the present disclosure. As shown in FIG. 7, a first server includes: a collection unit 71, configured to collect first information; a template generation unit 72, configured to parse, process or select the first information, to obtain at least one information material, and generate, based on or according to a same set of information materials, a media information form template or format supporting at least two types of scenario presentation requirements; a request obtaining unit 73, configured to receive or obtain a first request initiated by a data traffic monitor; and a request response unit 74, configured to respond to the first request, and send the information material and the media information form template based on or corresponding to the information material to the data traffic monitor, to obtain a presentation result according or corresponding to the information material and the media information form template.

A second server includes: a request initiation unit 80, configured to initiate a first request, such as an advertisement request; a request response unit 81, configured to: after a request including the information material and the media information form template corresponding to the information material is received, generate, according to the information material and the media information form template corresponding to the information material, a first rendering result supporting at least two types of scenario presentation requirements, the first rendering result including at least one of an information stream video or a pre-movie video; and a play selection unit 82, configured to: present the first rendering result in the data traffic monitor, and obtain a presentation requirement of a current scenario, to play the information stream video or the pre-movie video by selecting a media information play form matching with the current scenario or a terminal configuration parameter in the current scenario.

A first terminal is configured to provide the first information used by the first server for collection and analysis.

A second terminal is configured to present a final rendering result, including the first rendering result obtained by the first server by rendering and/or the second rendering result obtained by the second server by rendering, in a web page (H5) or an application page corresponding to the data traffic monitor.

Based on the foregoing embodiment, in an implementation of this embodiment of the present disclosure, the second server further includes a rendering result generation unit, configured to: receive the information material and the media information form template corresponding to the information material from the data traffic monitor; generate a first rendering component according to a native basic interface provided by the media information form template; generate a second rendering component according to a designated changeable interactive interface provided by the media information form template; generate a third rendering component according to the native basic interface and the designated changeable interactive interface; and generate a second rendering result according to the information material and the media information form template corresponding to the information material, the first rendering component, and/or the second rendering component, and/or the third rendering component.

The second rendering result herein includes at least one of an information stream video or a pre-movie video.

Correspondingly, the play selection unit in the second server is further configured to: present the second rendering result in the data traffic monitor, and obtain a presentation requirement of a current scenario, to play the information stream video or the pre-movie video by selecting a media information play form matching with the current scenario or a terminal configuration parameter in the current scenario.

Based on the foregoing embodiment, the first server in this embodiment of the present disclosure further includes: a configuration unit, configured to: after the first information is collected, configure a target user group to which the information is placed, the first information including video information and image information; a targeting policy generation unit, configured to generate an information placement targeting policy according to the first information and the target user group, the information placement targeting policy including performing a mixed arrangement on the video information and the image information; and an information placement unit, configured to place the first information to the target user group according to the information placement targeting policy, the target user group including the data traffic monitor.

Based on the foregoing embodiment, the first server in this embodiment of the present disclosure further includes: a mixed-arrangement performing unit, configured to: after the first request initiated by the data traffic monitor is obtained, if it is detected that there is no to-be-placed video information, insert, in an idle information position used for presenting the presentation result, the image information being in the mixed arrangement with the video information, and present the image information. When the targeting policy generation unit is further configured to generate the information placement targeting policy according to the first information and the target user group, the information placement targeting policy further includes: for a targeting condition of the video information, selecting at least one of a networking manner, educational background information, terminal device information, or area information to select the target user group to which the information is placed by targeting.

Based on the foregoing embodiment, in addition to the first server and the second server, the information processing system in this embodiment of the present disclosure further includes a first terminal and a second terminal. The first terminal is configured to provide the first information used by the first server for collection and analysis. The second terminal is configured to present a final rendering result (including the first rendering result obtained by the first server by rendering and/or the second rendering result obtained by the second server by rendering) in a web page (H5) or an application page corresponding to the data traffic monitor.

It should be noted herein that, the foregoing terminals (the first terminal and the second terminal) may be an electronic device such as a PC, may further be a portable electronic device such as a PAD, a tablet computer, or a laptop computer, and may further be an intelligent mobile terminal such as a mobile phone, and is not limited to descriptions herein. The servers (the first server and the second server) may be an electronic device includes a cluster system and combines as one for implementing each unit function or each unit function separately is disposed. Both a client and the server at least include a database used for storing data and a processor used for processing data, or include a storage medium disposed in the server or a separately disposed storage medium.

For the processor used for processing data, when performing processing, may be implemented by a microprocessor, a CPU, a DSP, or an FPGA. The storage medium includes an operation instruction. The operation instruction may be computer executable code. Each step in the procedure of the foregoing information processing method in the embodiments of the present disclosure is implemented by using the operation instruction.

Figure 8:
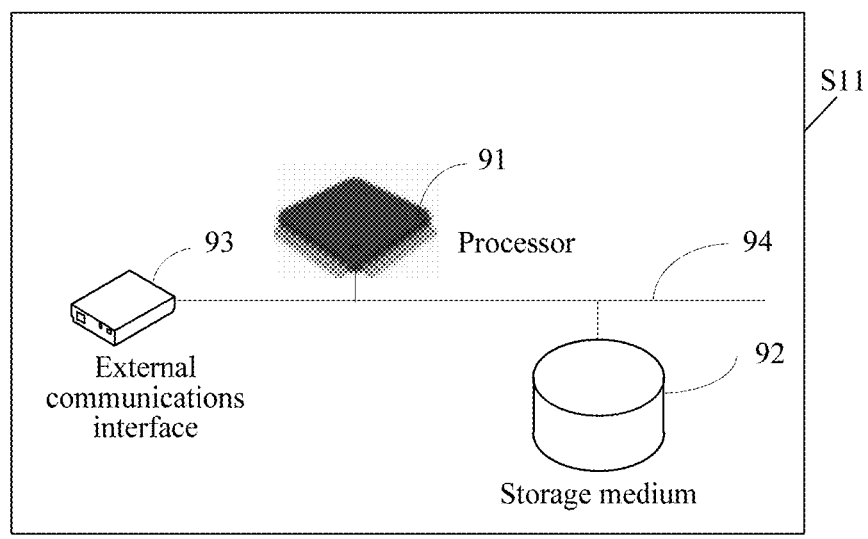
FIG. 8 is a schematic diagram of structural composition of hardware according to Embodiment 7 of the present disclosure.

An example in which the client and the terminal are used as hardware entities S11 is shown in FIG. 8. The apparatus includes a processor 91, a storage medium 92, and at least one external communications interface 93. The processor 91, the storage medium 92, and the external communications interface 93 are connected by using a bus 94.

It should be noted herein that, the descriptions above related to the terminal and the server are similar to the method descriptions above, and are the same as the descriptions of beneficial effects of the method, and are not described herein again. For technical details not disclosed in the client and server embodiments of the present disclosure, refer to the descriptions of the method embodiments of the present disclosure.

In this application scenario, according to this embodiment of the present disclosure, information is advertisement information. A material is processed by using a server (such as an advertisement analyzing and processing platform). A multiform template generated by processing may adapt to presentation requirements of different scenarios such as websites and applications, to support an adaptive presentation form to match with different use scenarios and/or terminal configurations/parameters in different scenarios.

Technical terms used in this application scenarios include: 1) A native mobile video advertisement, refers to a video material placed by an advertiser by logging in to a first terminal, and may be presented in a plurality of different web pages or application traffics. A present form is completely integrated with page content, and the form is variable. The native mobile video advertisement may be inserted in an information stream, to form an information stream video. In addition to being in a video form, the native mobile video advertisement may further be in an image form. After being inserted into the information stream, the native mobile video advertisement may interact with a user, such as being paused; 2) A video pre-movie advertisement, refers to an advertisement started before or after a video is played. A pre pre-movie advertisement is a video advertisement presented before a video is played. In an embodiment, the video advertisements cannot be skipped. In an embodiment, an actual video main story can be watched after the video advertisement has been partially or completely or after a predetermined length or portion of the video advertisement has been watched. A post pre-movie advertisement is a video advertisement played after a video has been partially or completely played, or after a predetermined length or portion of the video advertisement has been played. In an embodiment, the video advertisement may be skipped or exited, but cannot be interacted with such as being paused. 3) An information stream video, refers to a video advertisement form introduced to an information stream, and automatically plays after being slid into a screen. The video may be paused or skipped.

Figure 9:
FIG. 9 to FIG. 17 are schematic diagrams of application scenarios to which embodiments of the present disclosure are applied.
Figure 10:
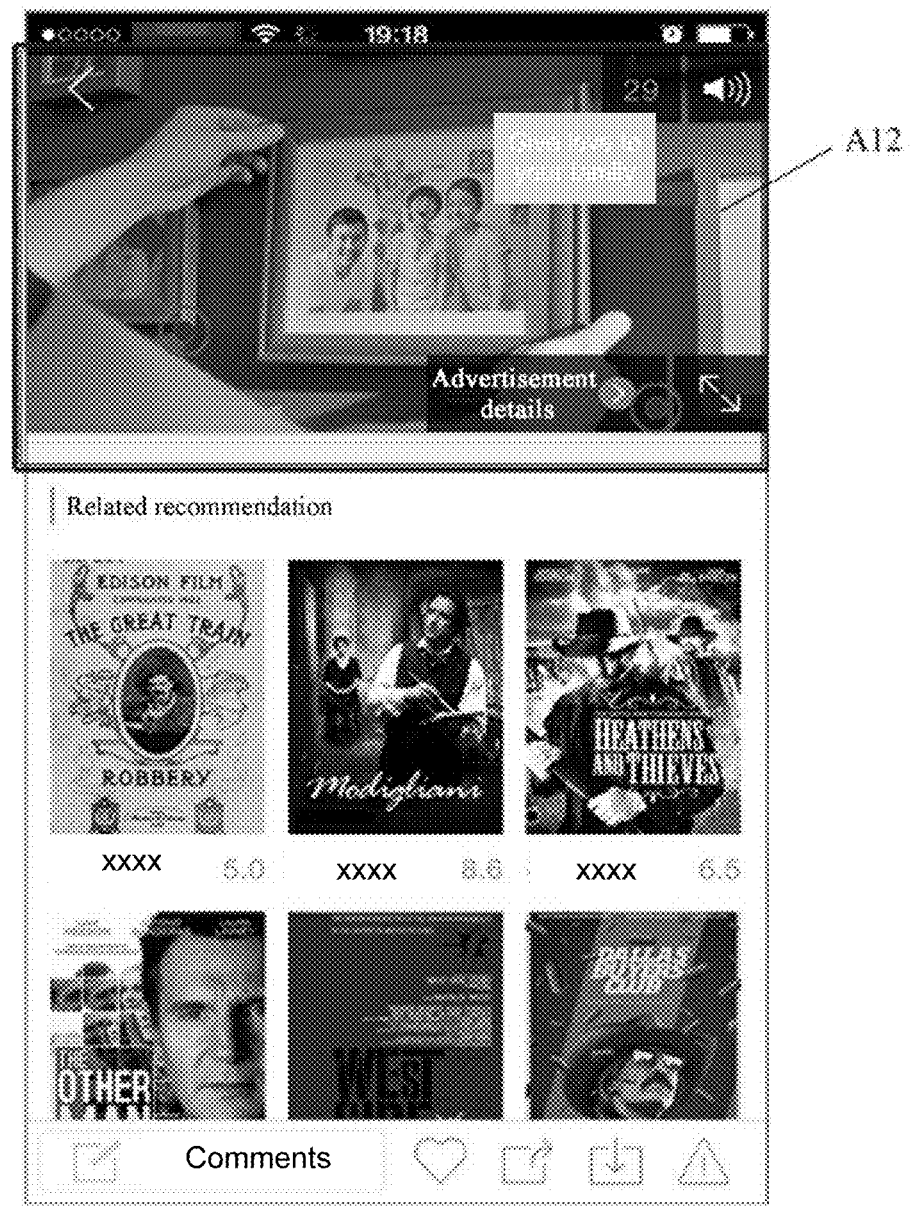

FIG. 9 shows a specific form of an information stream video formed after a native mobile video advertisement is introduced to an information stream. An information stream video is presented in a display region identified by A11 in FIG. 9. The information stream video has a player control such as a pause button, so that a video can be paused or skipped, and thereby interacting with a user well. FIG. 10 shows a specific form of a video pre-movie advertisement. A pre-movie advertisement is displayed in a display region identified by A12 in FIG. 10. In an embodiment, the pre-movie advertisement does not have a player control. In an embodiment, the video advertisement can be skipped or exited therefrom. In an embodiment, a user cannot interact with the video advertisement. In an embodiment, skipping to another advertisement details page by clicking advertisement details can be performed. In this application scenario, to introduce a native mobile video advertisement to an information stream video (or referred to as a native mobile and video advertisement) is an advertisement information presentation form currently displayed or viewed. An entire information interaction system includes a plurality of parties: 1) the first terminal, such as a terminal used by an advertiser to provide advertisement element and promotion content; 2) a first server functioning as a middle party to coordinate and process information, such as an advertisement analyzing and processing platform; 3) a second server established information association with the first server, such as a data traffic monitor that provides advertising spaces and cooperatively works with the first server to fill the advertising spaces with advertisements from the first server. The data traffic monitor may be a shopping website, a portal site, an application provider, or the like, and the data traffic monitor may also be referred to as a mobile alliance corporation party of the advertisement analyzing and processing platform; and 4) a second terminal. The user of the second terminal may also be referred to as an audience or an advertisement information presentation receiver. In one embodiment, the first server may obtain the advertisement element from the first terminal, and generate a media information form template corresponding to the advertise element. The generated media information form template supports at least two types of use scenarios. The first server may provide the media information form template to the second server to perform designated modification, or directly provide the template to the second server for its own use. A policy of whether to perform modification is automatically determined by the second server. The second server obtains, by re-rendering according to the specific policy of the second server obtains and based on the template, video advertisement information adapted for or for presentation at the second terminal. That is, a same advertisement element may be obtained from the first terminal (or transmitted by the first terminal), the template is generated by the first server, the processing or rendering is performed by the first server or by a second server, and the rendering result is presented or displayed on a second terminal. The same advertisement element can be played or displayed on different terminals, and a diversified video advertisement rendering result is obtained. In another example: a same advertisement element may be obtained from the first terminal, both the template and the rendering are generated by the first server, to obtain a rendering result, and the second server provides the rendering result to the second terminal, so that diversified video advertisement rendering results of a same advertisement element may be presented on different second terminals. Still another specific implementation is: a same advertisement element may be obtained from the first terminal, both the template and the rendering are generated by the second server, to obtain a rendering result, and the second server only needs to present the rendering result on the second terminal, so that the same advertisement element is also placed to different terminals, and a diversified video advertisement rendering result may also be obtained. In this way, because a rendering result of diversified video advertisement adapts to different scenarios or configuration results of terminals of different scenarios, information is highly integrated and has good interaction performance, and can bring a better information display and interaction effect for an audience. The new video advertisement form generated according to this embodiment of the present disclosure provides a better sense of integration and interaction performance for the audience.

In this application scenario, to introduce a native mobile video advertisement to an information stream video is a new advertisement information presentation form. In a current native advertisement, an advertisement element is mainly an image, a text, and an icon (icon), and a video element and an advertisement form are not introduced to. In the field of mobile video advertisement, for a form, a form is classified into a pre-movie advertisement (a video advertisement presented before or after a video is played), an information stream advertisement, an excitation video (a gift or a device is rewarded after a video is watched), a native video advertisement, and the like. It can be seen that a video advertisement element is increasingly diversified. However, because there is no uniformed and standard template, it is very inconvenient to integrate the diversified template forms. Moreover, for a same advertisement element, because presentation requirements (a video size, bitrate, format, and element) for the advertisement element vary in different terminals, and there is no processing mode to standardize and a native video advertisement and make the native video advertisement to be a template, to form a processing mode to make a template is a first problem needing to be resolved.

Video presentation forms of most current mobile video advertisements are copied from that of the era in which computers are used to get online. A video advertisement presented before or after a video is played is in a pre-movie advertisement form. Even an information stream video advertisement is released in a mobile terminal, generally there is no form innovation and diversity. Therefore, to provide more selections is a second problem to be resolved.

For the foregoing two problems, in this application scenario, according to this embodiment of the present disclosure, for media information (text, image, or video), and mainly for the video information, a video advertisement element is unified, so that the video advertisement information can be placed once, makes it easier for the video advertisement information to be placed, and a video can be presented in various forms.

The presentation form can be rendered according to a page, an APP scenario, and content. Information presentation is highly integrated, and is highly integrated with information of an original page or an application page, and huge interference experience brought by a mobile advertisement to an audience by can further be reduced. For a placement policy, because a current targeting condition of a video advertisement is limited and is mainly an area selection, according to this embodiment of the present disclosure, for a targeting condition, a native mobile video advertisement is placed to a user group by targeting by selecting more than 30 conditions such as networking manner, educational background, device information, and area. This provides more diversity and selections. In an embodiment, a processing policy may include: performing fixed arrangement on the native mobile video advertisement and an image. For example, when there is no advertiser placing a native mobile video advertisement, an image may be inserted in the idle advertisement information position. By performing the mixed arrangement on the video and image, more selection is provided.

In this application scenario, a native mobile video advertisement is introduced to an information stream video, and by integrating the advertisement element, a form template is generated. For the advertiser replacement: various presentation forms may be implemented for a one-time placement. Visible-designed advertisement forms of a website and an APP are integrated in a presentation form, and are highly integrated with an advertisement playing scenario. When performing placement, by using advertisement elements collected by a foreground placement terminal, powerful targeting sorting processing performed by a background server side, and delivery of the advertisements elements by using a data traffic terminal, placement people and users can be selected by targeting, and algorithm bidding and sorting is performed by mixing an image and a video, and an advertisement of a matching relevance and high following rate is preferably selected.

The advertisement analyzing and processing platform or system used as a middle party to coordinate and process information provides a placement entrance for (such as e.qq.com) of a native mobile advertisement to the advertiser, so that the data traffic monitor can obtain a native advertisement, by using various manners of accessing an SDK, an API, and a DSP, from information placement to information presentation, closed-loop processing of the entire information processing mode is performed. Different from the existing technology, in this embodiment of the present disclosure: first, placement manner is different from a current manner, an advertisement is placed by collecting an advertisement element, and a video can be placed by selecting a series of people targeting such as area, age, educational background, network access manner, and mobile platform. Likewise, the advertisement element is obtained according to industrial standard and by analyzing and summarizing. In addition, the data traffic terminal may select, according to a requirement of a presentation position of the advertisement element, content to be presented, to perform form rendering. For example, different advertisement forms obtained by rendering are different when the presentation positions are different.

Figure 11:
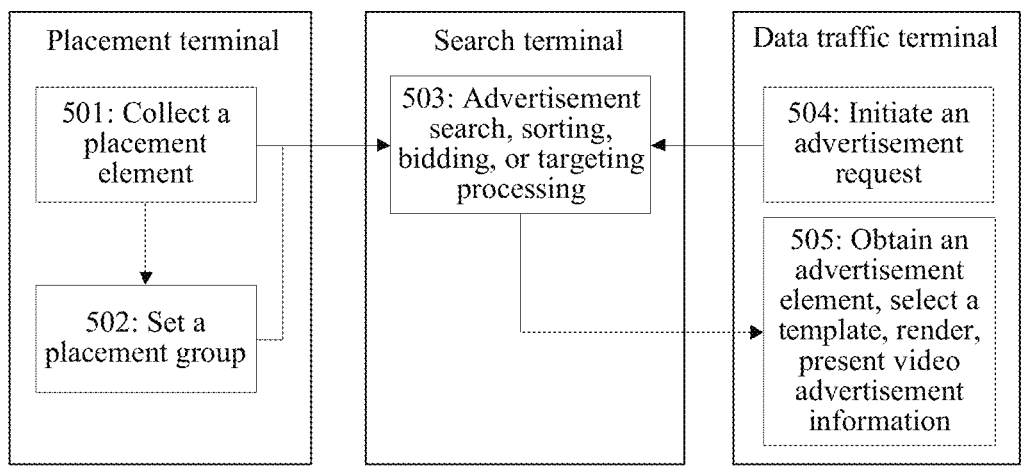

Processing mechanisms of each segment related to an entire processing procedure of the embodiments of the present disclosure used in this application scenario are described as follows:

First. For an entire information processing procedure, as shown in FIG. 11, a system architecture includes: 1) A foreground placement terminal, may be a first terminal; 2) A search terminal, may be a first server used as a middle party to coordinate and process information; and 3) A data traffic terminal, creating a second server of which information is associated with the first server used as a middle party to coordinate and process information. The data traffic monitor may be a shopping website, a portal site, an application provider, or the like. The data traffic monitor may also be referred to as a mobile alliance corporation party of the advertisement analyzing and processing platform.

A specific information processing procedure implemented based on the foregoing three party includes:

Step 501: Collect an advertisement element from the placement terminal. The advertisement element may be a placement element of a video advertisement.

Step 502: Set a target user group in the placement terminal, such as a placement group).

The advertisement element and the target user group obtained in steps 501 and 502 may be sent to a search terminal for analyzing and processing, to generate a targeting policy.

Step 503: Set a targeting policy such as advertisement search, sorting, bidding, or targeting processing in the search terminal, to place the information to a corresponding target user group.

Step 504: The data traffic terminal initiates an advertisement request to the search terminal.

Step 505: The data traffic terminal obtains the advertisement element, such as the placement element of a video advertisement, from the search terminal, selects a diversified template adapting to different scenarios, and uses the diversified template to render the advertisement element, to obtain video advertisement information finally presented on a second terminal, and presents the video advertisement information on the second terminal by using a video. The second terminal refers to a terminal in which a user is in, or a terminal that receives advertisement data.

Based on the foregoing system architecture, in a processing of collecting the advertisement element, the advertisement element may be actively uploaded by using the placement terminal (such as the advertiser) and/or the advertisement element may be automatically collected by using the advertisement analyzing and processing platform or system used as a middle party for coordinating and processing information.

In one embodiment, the above-described system architecture can implement the disclosed method as following. An advertiser uploads, using a first terminal, first information to an advertisement analyzing and processing platform or system. The first information includes an advertisement element. The first information may further include parameters related to the advertisement, such as:

advertising copy (title) 20 characters
advertisement description: 30 character
video: 640*360; shorter than 1 MB; MP4 format, H264
image: 640*360

System automatic collection may be performed. That is, the advertisement analyzing and processing platform may collect information about a to-be-promoted product corresponding to the advertisement element. The to-be-promoted product may be provided by the advertiser to the advertisement analyzing and processing platform using an identifier, a link or input on a graphical user interface. For example, the to-be-promoted product may be a mobile application program (hereinafter abbreviated as promotion APP). The advertisement analyzing and processing platform may query a record in a software installation platform (such as MyApp Store) to collect information about the promotion APP. The collected information may include: a logo and a name of the promotion APP recorded in the software installation platform as follows.

72*72 logo
application name

Figure 12:
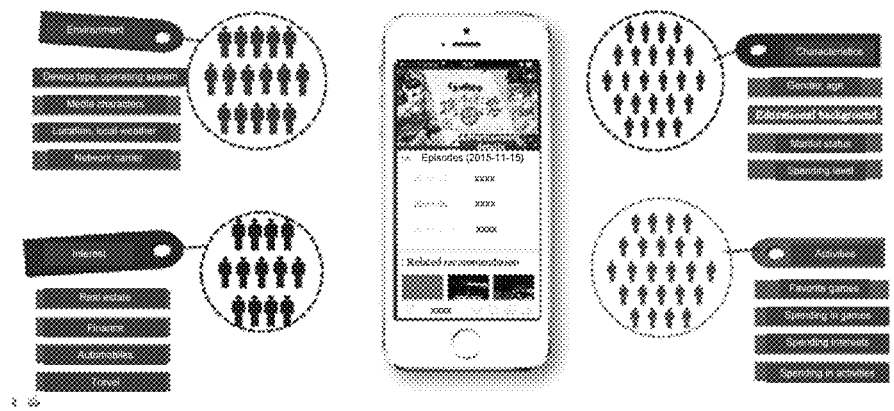

Based on the foregoing system architecture, the advertisement analyzing and processing platform may design a placement policy of the advertisement element, i.e., determine where to place the advertisement (e.g., target user group, target webpage, etc.). In one embodiment, the advertisement element may be distributed in the form of a native video which allows a powerful system targeting capability: a native mobile video advertisement has a form different from that of a traditional video advertisement. When determining the placement policy of advertisements, specific people may be selected to be targeted, a powerful background system capability of the advertisement analyzing and processing platform may be used. User group(s) that follows certain topic or has certain interests related to promoted product may be reached by the advertisement analyzing and processing platform using an attribute tag, to accurately push the native mobile video advertisement to the target user group. For example, as shown in FIG. 12, approximately 30 targeting conditions may be set and provided to the advertiser for selecting a desired advertisement placement policy.

Figure 13:
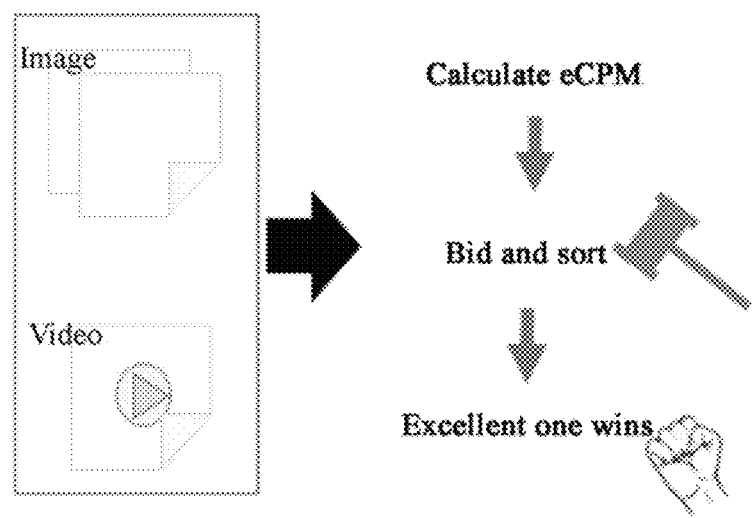

In the design of the placement policy, for a native video sorting algorithm, an advertisement may be presented in different forms. For example, a same advertisement position/slot may present either a video advertisement or an image advertisement, such that more selections are provided to the advertiser. In some embodiments, the eCPM is an abbreviation of effective cost per mille, and refers to advertisement revenue every thousand time the advertisement is presented. A presentation unit may be a web page, an advertisement unit, or even a single advertisement. The system may perform sorting and bidding on the specific advertisement element according to the eCPM. As shown in FIG. 13, an excellent advertisement may obtain a final presentation opportunity. In addition to providing more selections to the user and presenting information in more diversified manners, during actual application, data traffic yield can further be presented in a maximum manner. In addition, when there is no video advertisement order from the advertiser, an image advertisement may be set, and the advertisement position is not idle. This is also a technical measure to implement maximum data traffic yield.

Based on the foregoing system architecture, in the information processing procedure, when the advertisement element is presented in the data traffic terminal (e.g., the second terminal), the data traffic monitor (e.g., a website or an application that offers advertisement position) can select an element according to a requirement of itself, to perform rendering and presentation by selecting an advertisement element meeting the requirement of itself, so that the advertisement element is closely integrated with the original content. For example, video advertisement information obtained currently by means of rendering may be highly integrated with information of content of a video currently being played. Because of the seamless implementation of such high information integration, when the user performs information interaction, it is easier for the user to respond and provide feedback to the video advertisement information obtained by rendering, so that it is easier to implement data traffic variation during actual application, to implement maximum data traffic yield.

As a middle party that coordinates and processes information, the advertisement analyzing and processing platform or system provides, to the data traffic monitor, Software Development Kit (SDK) which is a powerful component corresponding to a Multimedia information display and release system (e.g., MediaView). The SDK may be used for managing play of the video advertisement information and reflow/tracking of effective data, and is described in detail in a subsequent scenario and is not described herein.

Based on the system architecture, when the basic materials of the native video advertisement are obtained, after parsing and withdrawing the material uploaded by the advertiser, the advertisement analyzing and processing platform or system stores the material in a content delivery network (CDN), and provides the material to the data traffic monitor by using a public interface. The data traffic monitor may be an application provider, such as a shopping application corresponding to a shopping platform. Basic interface provided by the advertisement analyzing and processing platform or system for obtaining information of the native video advertisement material includes:

getTitle( )//get an advertisement title
getDesc( )//get an advertisement description
getIconUrl( )//get an advertisement icon
getImgUrl( )//get an advertisement image
isAPP( )//whether an advertisement is an App
isVideoAD( )//whether an advertisement is a video
onExposured(View view)//expose this advertisement
onClicked(View view)//click an advertisement
getAPPStatus( )//get a download and installation status of an App
getProgress( )//get a download progress of an App
getDownloadCount( )//get a download count of an App
getAPPScore( )//get a score of an App
getAPPPrice( )//get a price of a paid App These basic interfaces allow the advertiser to provide basic rendering information of an advertisement to the data traffic monitor, including a material shared by both a video-format advertisement and a non-video format advertisement.

Figure 14:
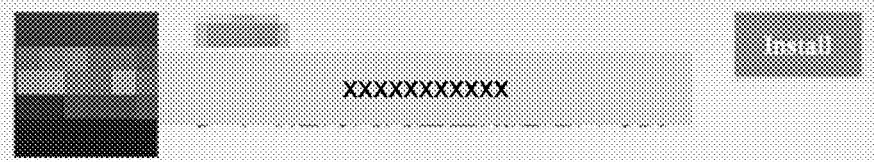
Figure 14:
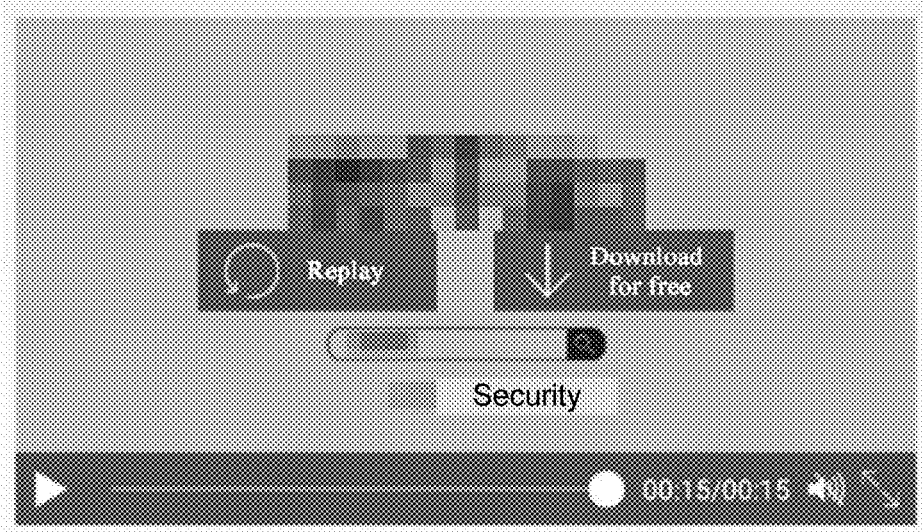
Figure 15:
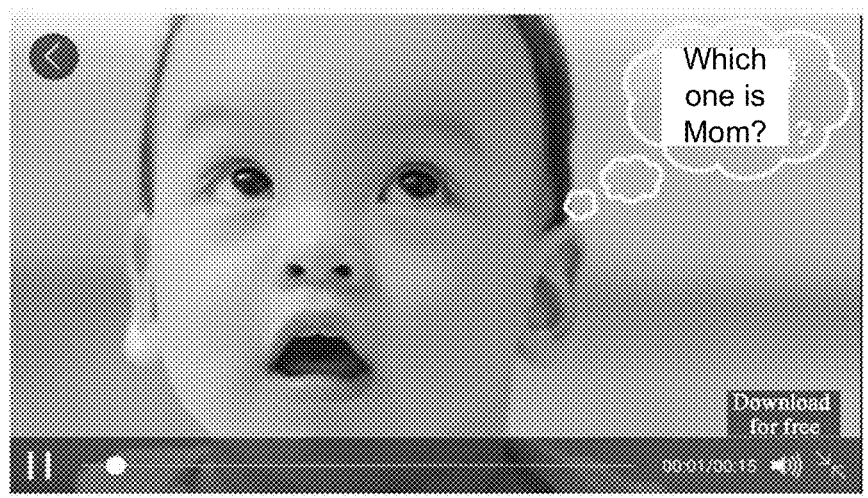

Based on the foregoing system architecture, for an interaction interface being able to perform interaction in this embodiment of the present disclosure, a general video advertisement user interaction interface is provided. An exemplary video advertisement user interaction interface is shown in FIG. 14 and FIG. 15. FIG. 14 is in a non-full screen state. FIG. 15 is in a full screen state. This embodiment of the present disclosure introduces a native mobile advertisement to an information video stream. A difference from the existing technology is that: Compared with an existing video advertisement, a video advertisement in this embodiment of the present disclosure provides rich user interaction. In the video advertisement in this embodiment of the present disclosure, a user is allowed to perform interactive operations below, so that it is convenient for the user to respond to and provide feedback to the presented information. These feedbacks may be further collected to optimize various policies.

pause/play
fast forward/fast rewind
enter/exit a full screen
mute/set volume on
a progress bar and time reminder
review
download an advertisement APP/jump to a landing page In this embodiment of the present disclosure, the advertisement analyzing and processing platform or system provides a media information form template having a default user interactive interface to a data traffic monitor by using the SDK. A data traffic monitor of a non-video type can access, by using the MediaView component for free, the native video advertisement provided by the advertisement analyzing and processing platform or system to the data traffic monitor. Usually, such type of data traffic monitor does not need to consider effects such as video interaction performance, video exposure, click, and replay. These are all processed by the SDK. A play interface provided by GDT SDK further supports to automatically pause/continue playing the video advertisement in the information stream according to a position of the video advertisement MediaView component in the screen. When a user visible area of a video is less than 50%, the video advertisement information is automatically paused being played. When the user visible area is greater than 50%, the video is automatically played. In a default interactive mode provided by the SDK, it is very easy to access these functions.

Based on the foregoing system architecture, for a general video advertisement user interactive interface in this embodiment of the present disclosure, the native video advertisement in this embodiment of the present disclosure supports a plurality of advanced user interactive interfaces, allowing the data traffic monitor to implement its own setting for playing the video advertisement. The SDK provides the native video interactive interfaces below to the data traffic monitor:

bindView(MediaView view)//bind MediaView
release( )//release a MediaView resource
play( )//play
play(int position, View view) play (automatically manage pause/recovery)
stop( )//pause
release( )//release a resource
getCurrentPosition( )//get a current play progress
getDuration( )//get video total duration
seekTo(long position)//fast forward/fast rewind onClicked(View view)//click an advertisement For a data traffic monitor having customized user interaction, a default interaction interface provided by the SDK is not selected, and interactive rendering required by the data traffic monitor can be implemented by using the foregoing interfaces. Usually, a data traffic monitor that needs to customize interaction (e.g., render the advertisement) having distinct interface theme elements, to enable the native video advertisement to be closely integrated with "native content" in an App of the data traffic monitor, to provide native effective experience for a user, and to present value of the native video advertisement in a maximum manner. That is, the data traffic monitor may generate a media information form template supporting at least two types of scenario presentation requirements corresponding to the advertisement.

Based on the system architecture, for the native video player MediaView component in this embodiment of the present disclosure, in the native video advertisement SDK, the advertisement analyzing and processing platform or system used as a middle party to coordinate and process information provides the MediaView component in the foregoing scenario by using the SDK to the data traffic monitor. The component bears the two capabilities mentioned above, one is video decoding and playing, and the other is interaction between a user and the video advertisement. There are two important components GDTVideoPlayer and GDTMediaController in the MediaView. The GDTVideoPlayer is responsible for decoding and playing the video, and provides a series of video playing interfaces to the outside.

play( )//play
pause( )//pause
stop( )//stop
seekTo(int pos)//fast forward/fast rewind
isPlaying( )//check whether a video is playing
isMute( )//check whether a video is mute
getDuration( )//get video duration
getCurrentPosition( )//get a current video play position
getVideoState( )//get a video play state
setVolumeOff( )//set volume off
setVolumeOn( )//set volume off These interfaces are not completely public, but are disclosed to the data traffic monitor after being packed by the MediaView mentioned above, to ensure that the advertisement analyzing and processing platform or system used as a middle party to coordinate and process information can keep an interface security controllable ability.

The GDTMediaController is responsible for interactions between the user and the video, and can selectively present or hide interface elements such as control bars according to click behaviors performed by the user on the screen. These abilities are also not disclosed to the outside, and like the GDTVideoPlayer, are disclosed to the outside by using the MediaView as a medium. In this way, when the SDK is upgraded in future, the external interface can still be controlled.

The content above is descriptions of several examples of specific implementations of allowing, by the SDK, a data traffic monitor to customize a capability of an interactive interface. In an aspect of video encoding, SDK transcodes, by relying on material parsing and withdrawing ability of a placement terminal of the advertisement analyzing and processing platform or system used as a middle party to coordinate and process information, a video uploaded by an advertiser, and stores the video in a standard MP4 format. Therefore, the video can be directly played in a standard mobile operating system, without needing to add a third-party video decoding packet, to further reduce costs of accessing the SDK by the data traffic monitor, and the SDK packet is controlled to have a minimum volume.

Figure 16:
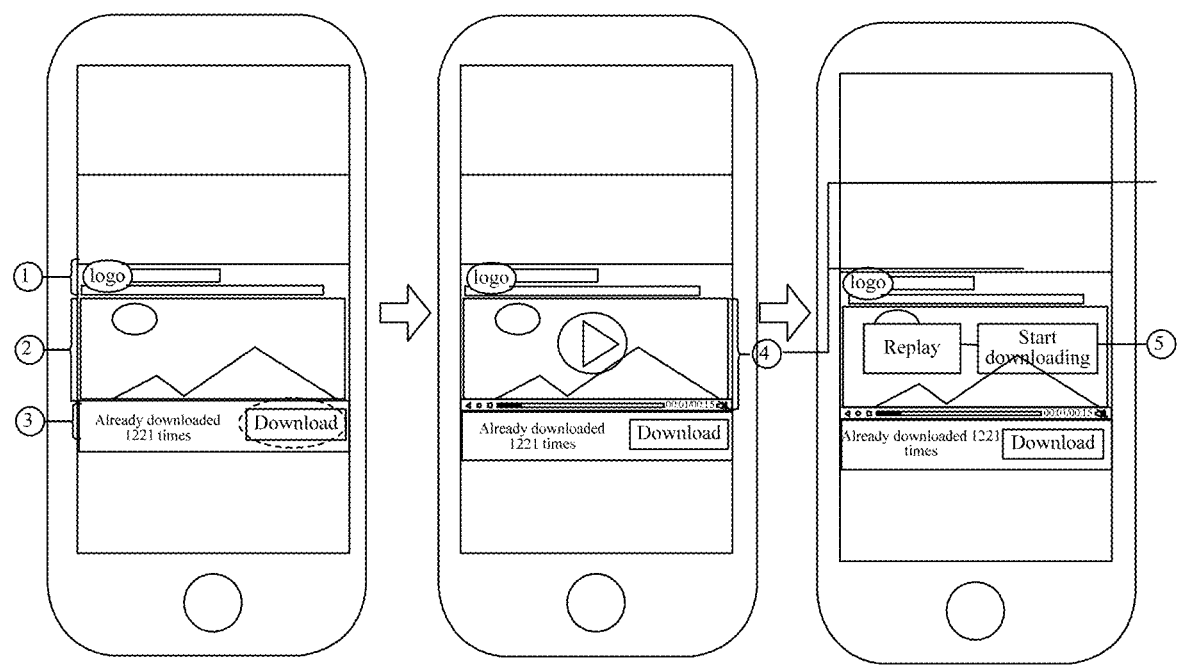
Figure 17:
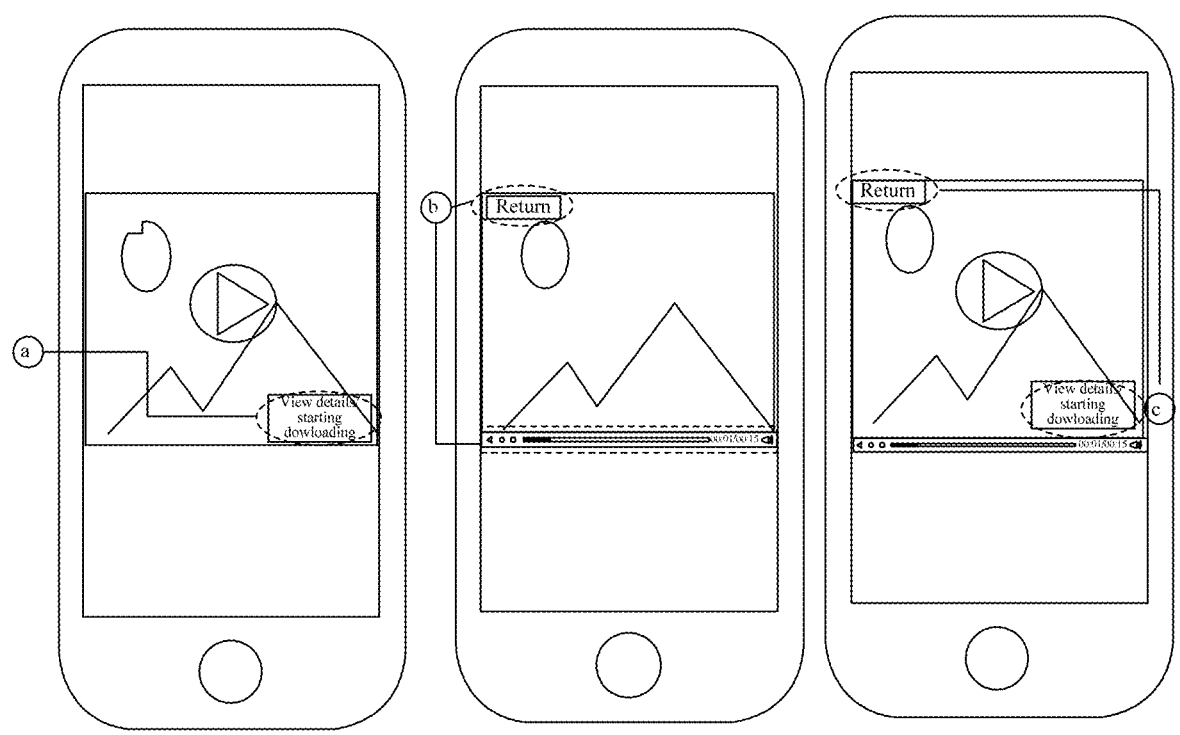

Based on the foregoing system architecture, a final result obtained by rendering is shown in FIG. 16 and FIG. 17, and is an interaction process in which a user responds to, by using a user interface interacted, video advertisement information obtained by rendering. For a same set of materials, due to different presentation requirements, presentation forms are different. An information stream video advertisement form (shown in FIG. 16) and a pre-movie video advertisement form are respectively used (shown in FIG. 17) as examples below. It should be noted that, a native video advertisement rendering form template is not limited to these two forms. In addition to these two cases, an advertisement form in which a rendering result is more integrated with a page may further be designed.

First. For the native video advertisement in this embodiment of the present disclosure, when the video advertisement information is presented in an information stream video advertisement form, a process in which the native video advertisement interacts with a user is shown in FIG. 16. The native video advertisement is automatically played in the information stream, CPM bidding, and is charged for being played every thousand times. An example of descriptions is as follows and includes the content below:

1. Click an advertisement logo displayed in a user interface, and skip from information content (such as text descriptions of the advertisement) to a data traffic monitor (such as to-be-promoted commodity landing page), download an application corresponding to the data traffic monitor or enter an H5 web page corresponding to the data traffic monitor, and then, report the click in the corresponding application page or the entered H5 web page and select a click type.

2. In an embodiment, video advertisement information is provided via a WI-FI connection, the video advertisement information is automatically played, and the advertisement is reported and exposed after being presented In an embodiment, one request only reports exposure once.

3. Click "download/view details", the logic is the same as content 1, that is, report the click in the corresponding application page or the entered H5 web page and select a click type. After the download, effective data starts to be downloaded. One play duration (report exposure) is reported after the play of video advertisement information is completed, when slides out of the screen and re-enters the screen, the video advertisement information is replayed, and a play duration is reported again during the play.

4. A control or a hidden control in the video advertisement information in a video play process, which appears when being clicked once, and a pause/play button appears on the screen at the same time. In a video play process, a drag operation and a voice-turning operation can be performed.

5. After the video advertisement information is completely played, re-play and "start to download/view details" are displayed, to direct the user to continue to perform operations of reporting a click and selecting a click type.

Second. For the native video advertisement in this embodiment of the present disclosure, when the video advertisement information is presented by in a pre-movie video advertisement form, a process in which the native video advertisement interacts with a user is shown in FIG. 17. An example of descriptions is as follows and includes the content below:

a. Pre pre-movie video advertisement: Video advertisement information is presented before watching or displaying the video. In an embodiment of a video advertisement information playing or displaying process, a video progress cannot be adjusted, but a screen extension or enlargement operation and a return operation can be performed. In an embodiment of a process of playing the video advertisement information, the video can be returned. In an embodiment, there is a "view details/start downloading" option/selection in the page displayed to the user, after click the "view details/start downloading" option/selection, a corresponding page of the data traffic monitor is skipped. The click is reported in the corresponding page, and the effect is reported after being downloaded.

b. Video playing page: After the video advertisement information is completely played, a page of playing viewing content is entered, and there is a progress bar and a return interaction operation in the page.

c. Post pre-movie video advertisement: A post pre-movie video advertisement is to automatically play the video advertisement information after the video is completely played, and in a play process, exit and return operations can be performed. There is "view details/start downloading" in the page, after click the "view details/start downloading", a corresponding page of the data traffic monitor is skipped to. The click is reported in the corresponding page, and the effect is reported after being downloaded.

Based on the above, it can be seen that for a same set of advertisement materials, the same set of advertisement materials not only can be rendered to be the information stream video form in the first case, but also can be rendered to be a video pre-movie position in the second case. In this way, requirements of adapting to various application scenarios are met, and the same set of advertisement materials is highly integrated with original information, and more interactive performance is provided.

The embodiments of the present disclosure further provide a computer storage medium storing a computer executable instruction, the computer executable instruction being configured to perform the foregoing information processing method.

In the several embodiments provided in this application, it should be understood that the disclosed device and method may be implemented in other manners. For example, the described device embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be delivered on a plurality of network units. Some or all of the units may be selected according to actual requirements to achieve the objectives of the solutions of the embodiments. In addition, functional units in the embodiments of the present disclosure may be integrated into one processing unit, or each of the units may be used as a unit alone, or two or more units are integrated into one unit. The integrated unit may be implemented through hardware, or may be implemented in a form of hardware plus a software functional unit.

A person of ordinary skill in the art may understand that all or some of the steps of the method embodiments may be implemented by a program instructing related hardware. The program may be stored in a computer readable storage medium. When the program runs, the steps of the method embodiments are performed. The foregoing storage medium includes any medium that can store program code, such as a mobile storage device, a read-only memory (ROM), a random access memory (RAM), a magnetic disk, or an optical disc.

Alternatively, when the integrated unit in the present disclosure is implemented with a software function module form and sold or used as an independent product, the integrated unit may be stored in a computer readable storage medium. Based on such an understanding, the technical solutions of the embodiments of the present disclosure essentially, or the part contributing to the existing technology, or some of the technical solutions may be implemented in a form of a software product. The software product is stored in a storage medium, and includes several instructions for instructing a computer device (which may be a personal computer, a server, a network device, and the like) to perform all or some of the methods described in the embodiments of the present disclosure. The foregoing storage medium includes: any medium that can store program code, such as a mobile storage device, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

INDUSTRIAL APPLICABILITY

According to the embodiments of the present disclosure, a media information form template supporting at least two types of scenario presentation requirements can be generated according to a same set of information materials, and therefore, when a first request initiated by a data traffic monitor is responded to, the information material and the media information form template corresponding to the information material are sent to the data traffic monitor, to obtain a presentation result according or corresponding to the information material and the media information form template. In this way, that a same material corresponds to a plurality of media information form templates may adapt to a presentation requirement of diversified scenarios, and an adaptive media information form template is provided to match with different scenarios or terminal configuration parameters in different scenarios, so that a presentation form is integrated with content of various user interfaces.

What is claimed is:

1. An information processing method implemented by a data traffic monitor and an advertisement processing server configured to communicate with the data traffic monitor, comprising:
collecting, by the advertisement processing server, a first information from a first terminal of an advertiser;

selecting from the first information at least one information material of an advertisement;

generating, by the advertisement processing server according to the information material, a media information form template of the advertisement supporting at least two types of scenario presentation requirements, the at least two types of scenario presentation requirements comprising an information stream video and a pre-movie video, the information stream video being a video advertisement form introduced in an information stream and automatically plays after being scrolled into a position on a display screen;

storing, by the advertisement processing server, the media information form template and the information material of the advertisement in a content delivery network (CDN);

providing, by the advertisement processing server, public interfaces for accessing information of the advertisement and a Software Development Kit (SDK) for managing, reflowing and tracking play of the advertisement to the first terminal of the advertiser and the data traffic monitor, wherein the data traffic monitor includes a distribution server configured to distribute the advertisement to user terminals, and the SDK is configured to implement, on a plurality of data traffic monitors, customized settings for integrating a playback of the advertisement with native contents in each of a plurality of application scenarios corresponding to the plurality of data traffic monitor, and the plurality of application scenarios that present the playback of the same advertisement include at least a social networking page and a mobile App with different customized settings determined by the corresponding plurality of data traffic monitors;

receiving, by the advertisement processing server, a first request for the information material and the corresponding media information form template from the data traffic monitor;

sending, by the advertisement processing server through the CDN and using at least one of the public interfaces, the information material and the media information form template corresponding to the information material to the data traffic monitor;

selecting, by the data traffic monitor, a current scenario presentation requirement according to: a media information play form matching a current scenario or a terminal configuration parameter in the current scenario; and generating, by the data traffic monitor and through the SDK received from the advertisement processing server, a presentation result according to the current scenario presentation requirement, the information material and the media information form template, the presentation result including the information stream video or the pre-movie video generated based on the same information material.

2. The method according to claim 1, wherein the method further comprises:

generating, according to the information material and the media information form template corresponding to the information material, a first rendering result supporting at least two types of scenario presentation requirements, wherein the first rendering result comprising at least one of the information stream video or the pre-movie video; and sending the first rendering result to the data traffic monitor.

3. The method according to claim 1, further comprising:
generating, by the data traffic monitor according to the information material and the media information form template corresponding to the information material, a first rendering result supporting at least two types of scenario presentation requirements and the first rendering result comprising at least one of the information stream video or the pre-movie video.

4. The method according to claim 1, wherein the method further comprises:

receiving, by the data traffic monitor, the information material and the media information form template corresponding to the information material;

generating a first rendering component according to a native basic interface provided by the media information form template;

generating a second rendering component according to a designated changeable interactive interface provided by the media information form template;

generating a third rendering component according to the native basic interface and the designated changeable interactive interface; and generating a second rendering result according to the information material and the media information form template corresponding to the information material, the first rendering component, and/or the second rendering component, and/or the third rendering component.

5. The method according to claim 4, wherein the second rendering result comprises at least one of the information stream video or the pre-movie video.

6. The method according to claim 1, wherein the method further comprises:

after collecting the first information, configuring a target user group to which the information is to be presented, and the first information comprising video information and image information;

generating, according to the first information and the target user group, an information placement targeting policy, the information placement targeting policy comprising performing a mixed arrangement on the video information and the image information; and placing the first information to the target user group according to the information placement targeting policy, the target user group comprising the data traffic monitor.

7. The method according to claim 6, wherein the method further comprises:

inserting, in an idle information position used for presenting the presentation result if there is no to-be-placed video information, the image information being in the mixed arrangement with the video information, and presenting the image information.

8. The method according to claim 1, wherein the method further comprises:

selecting at least one targeting condition when rendering the information material and the media information form template corresponding to the information material; and obtaining, by rendering according to the at least one targeting condition, a first rendering result or a second rendering result corresponding to the at least one targeting condition, and using the first rendering result or the second rendering result as a presentation result of the data traffic monitor; wherein:

the first rendering result being obtained by rendering according to the information material and the media information form template corresponding to the information material; and the second rendering result being obtained by rendering according to the information material, the media information form template corresponding to the information material, or a rendering component.

9. A server, the server comprising: a memory storing a computer program; and a processor, when executing the computer program, configured to:

communicate with a data traffic monitor;

collect first information from a first terminal of an advertiser;

select from the first information at least one information material of an advertisement, and generate, according to the information material, a media information form template of the advertisement supporting at least two types of scenario presentation requirements, the at least two types of scenario presentation requirements comprising an information stream video and a pre-movie video, the information stream video being a video advertisement form introduced in an information stream and automatically plays after being scrolled into a position on a display screen;

store the media information form template and the information material of the advertisement in a content delivery network (CDN);

provide public interfaces for accessing information of the advertisement and a Software Development Kit (SDK) for managing, reflowing and tracking play of the advertisement to the first terminal of the advertiser and the data traffic monitor, wherein the data traffic monitor includes a distribution server that distributes the advertisement to user terminals, and the SDK implements, on a plurality of data traffic monitors, customized settings for integrating a playback of the advertisement with native contents in each of a plurality of application scenarios corresponding to the plurality of data traffic monitor, and the plurality of application scenarios that present the playback of the same advertisement include at least a social networking webpage and a mobile App with different customized settings determined by the corresponding plurality of data traffic monitors;

receive a first request for the information material initiated by a data traffic monitor; and respond to the first request, and send, through the CDN and using at least one of the public interfaces, the information material and the media information form template corresponding to the information material to the data traffic monitor, wherein the data traffic monitor selects a current scenario presentation requirement according to a media information play form matching a current scenario or a terminal configuration parameter in the current scenario; and display a presentation result generated by the data traffic monitor and through the SDK received from the server according to the current scenario presentation requirement, the information material and the media information form template, the presentation result including the information stream video or the pre-movie video generated based on the same information material.

10. The server according to claim 9, wherein the processor is further configured to:

generate, according to the information material and the media information form template corresponding to the information material, a first rendering result supporting at least two types of scenario presentation requirements, the first rendering result comprising at least one of the information stream video or the pre-movie video; and send the first rendering result to the data traffic monitor.

11. The server according to claim 9, wherein the processor unit is further configured to:

generate, according to the information material and the media information form template corresponding to the information material, a first rendering result supporting at least two types of scenario presentation requirements, the first rendering result comprising at least one of the information stream video or the pre-movie video.

12. The server according to claim 9, wherein the processor is further configured to:

receive the information material and the media information form template corresponding to the information material from the data traffic monitor;

generate a first rendering component according to a native basic interface provided by the media information form template;

generate a second rendering component according to a designated changeable interactive interface provided by the media information form template;

generate a third rendering component according to the native basic interface and the designated changeable interactive interface; and generate a second rendering result according to the information material and the media information form template corresponding to the information material, the first rendering component, and/or the second rendering component, and/or the third rendering component.

13. The server according to claim 12, wherein the second rendering result comprises at least one of the information stream video or the pre-movie video.

14. The server according to claim 9, wherein the processor is further configured to:

after collecting the first information, configure a target user group to which the information is placed, the first information comprising video information and image information;

generate, according to the first information and the target user group, an information placement targeting policy, the information placement targeting policy comprising performing a mixed arrangement on the video information and the image information; and place the first information to the target user group according to the information placement targeting policy, the target user group comprising the data traffic monitor.

15. The server according to claim 14, wherein the processor is further configured to:

after obtaining the first request initiated by the data traffic monitor, if it is detected that there is no to-be-placed video information, insert, in an idle information position used for presenting a presentation result, the image information being in the mixed arrangement with the video information, and present the image information.

16. The server according to claim 9, wherein the processor is further configured to:

select at least one targeting condition when rendering the information material and the media information form template corresponding to the information material; and obtain, by rendering according to the at least one targeting condition, a first rendering result or a second rendering result corresponding to the one targeting condition, and use the first rendering result or the second rendering result as a presentation result of the data traffic monitor, the first rendering result being obtained by rendering according to the information material and the media information form template corresponding to the information material, and the second rendering result being obtained by rendering according to the information material, the media information form template corresponding to the information material, or the rendering component.

17. A non-transitory computer storage medium storing a computer executable instruction, the computer executable instruction being configured to cause a processor of an advertisement processing server to communicate with a data traffic monitor and perform a plurality of operations comprising:

collecting first information from a first terminal of an advertiser;

select from the first information at least one information material of an advertisement, and generating, according to the information material, a media information form template of the advertisement supporting at least two types of scenario presentation requirements, the at least two types of scenario presentation requirements comprising an information stream video and a pre-movie video, the information stream video being a video advertisement form introduced in an information stream and automatically plays after being scrolled into a position on a display screen;

storing the media information form template and the information material of the advertisement in a content delivery network (CDN);

providing public interfaces for accessing information of the advertisement and a Software Development Kit (SDK) for managing, reflowing and tracking play of the advertisement to the first terminal of the advertiser and the data traffic monitor, wherein the data traffic monitor includes a distribution server configured to distribute the advertisement to user terminals, and the SDK is configured to implement, on a plurality of data traffic monitors, customized settings for integrating a playback of the advertisement with native contents in each of a plurality of application scenarios corresponding to the plurality of data traffic monitor, and the plurality of application scenarios that present the playback of the same advertisement include at least a social networking page and a mobile App with different customized settings determined by the corresponding plurality of data traffic monitors;

receiving a first request for the information material initiated by a data traffic monitor; and sending, through the CDN and using at least one of the public interfaces, the information material and the media information form template corresponding to the information material to the data traffic monitor, to generate a presentation result according to the information material and the media information form template corresponding to the information material, wherein the data traffic monitor is configured to select a current scenario presentation requirement according to a media information play form matching a current scenario or a terminal configuration parameter in the current scenario, and the presentation result is generated by the data traffic monitor and through the SDK received from the advertisement processing server according to the current scenario presentation requirement, the presentation result including the information stream video or the pre-movie video generated based on the same information material.

18. The method according to claim 1, further comprising:

providing the SDK that supports automatically pause and continue playing the information stream video according to a user visible area of the information stream video in the display screen.

19. The method according to claim 18, wherein the SDK supports automatically pause playing of the information stream video when the user visible area is less than a percentage of the display screen, and automatically play the information stream video when the user visible area is greater than the percentage of the display screen.

20. The method according to claim 1, wherein:

when the application scenario corresponding to a data traffic monitor is the social networking page, the customized settings include settings of re-rendering the information material as a post on a timeline; and when the application scenario corresponding to a data traffic monitor is the mobile App, the customized settings include settings of re-rendering the information material as a full-screen media.

* * * * *